US010002025B2

(12) United States Patent
Ozaki

(10) Patent No.: US 10,002,025 B2
(45) Date of Patent: Jun. 19, 2018

(54) COMPUTER SYSTEM AND LOAD LEVELING PROGRAM

(71) Applicant: Hitachi, Ltd., Tokyo (JP)

(72) Inventor: Nobuaki Ozaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days. days.

(21) Appl. No.: 15/120,781

(22) PCT Filed: Aug. 29, 2014

(86) PCT No.: PCT/JP2014/072710
§ 371 (c)(1),
(2) Date: Aug. 23, 2016

(87) PCT Pub. No.: WO2016/031041
PCT Pub. Date: Mar. 3, 2016

(65) Prior Publication Data
US 2016/0371121 A1 Dec. 22, 2016

(51) Int. Cl.
*G06F 9/46* (2006.01)
*G06F 9/50* (2006.01)
*G06F 3/06* (2006.01)

(52) U.S. Cl.
CPC .............. *G06F 9/505* (2013.01); *G06F 3/061* (2013.01); *G06F 3/0631* (2013.01); *G06F 3/0689* (2013.01); *G06F 9/50* (2013.01)

(58) Field of Classification Search
CPC ....................................................... G06F 9/52
(Continued)

(56) References Cited

U.S. PATENT DOCUMENTS

2005/0193167 A1* 9/2005 Eguchi .................... G06F 3/061
711/114
2005/0193168 A1* 9/2005 Eguchi .................... G06F 3/061
711/114

(Continued)

FOREIGN PATENT DOCUMENTS

JP 2005-242690 A 9/2005
JP 2008-269424 A 11/2008

OTHER PUBLICATIONS

International Search Report of PCT/JP2014/072710 dated Nov. 18, 2014.

*Primary Examiner* — Mehran Kamran
(74) *Attorney, Agent, or Firm* — Mattingly & Malur, PC

(57) ABSTRACT

A computer system comprises: a server transmitted an input/output processing request; a storage apparatus comprising input/output processing units capable of processing the input/output processing request, and the logical volumes; a management computer managed the storage apparatus; and a particular processor managed a particular resource group, wherein the particular processor is configured to: calculate a load balancing plan when a load on a first resource comprised in the particular resource group is excessive, to distribute a part of the load on the first resource to a second resource comprised in the particular resource group; output the load balancing plan in a manner that allows the load balancing plan to be displayed; and distribute the load on the first resource to the second resource by following the load balancing plan, when an instruction to execute the load balancing plan is received as a result of outputting the load balancing plan.

12 Claims, 18 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 2007/0055820 A1* | 3/2007 | Eguchi | ................... | G06F 3/061 711/114 |
| 2007/0094357 A1* | 4/2007 | Sugitani | ................ | G06F 9/505 709/219 |
| 2007/0248017 A1* | 10/2007 | Hinata | ................... | G06F 3/061 370/238 |
| 2008/0201542 A1* | 8/2008 | Maruyama | ........... | G06F 3/0607 711/165 |
| 2008/0216086 A1* | 9/2008 | Tanaka | ................... | G06F 3/061 718/105 |
| 2008/0256304 A1* | 10/2008 | Kezuka | ................... | G06F 3/061 711/145 |
| 2008/0263190 A1* | 10/2008 | Serizawa | ............. | G06F 3/0605 709/223 |
| 2008/0270720 A1* | 10/2008 | Tanabe | ................. | G06F 3/0605 711/162 |
| 2008/0301385 A1* | 12/2008 | Nagata | ................... | G06F 3/061 711/162 |
| 2010/0325379 A1 | 12/2010 | Eguchi et al. | | |
| 2011/0082988 A1* | 4/2011 | Kono | ................... | G06F 3/0605 711/161 |
| 2011/0138085 A1 | 6/2011 | Serizawa et al. | | |
| 2011/0314193 A1* | 12/2011 | Kaneda | ..................... | G06F 9/50 710/74 |
| 2012/0017061 A1* | 1/2012 | Kawaguchi | ........... | G06F 3/0607 711/165 |
| 2012/0042138 A1* | 2/2012 | Eguchi | ................... | G06F 3/061 711/154 |
| 2012/0089797 A1* | 4/2012 | Shibayama | ......... | G06F 11/3419 711/162 |
| 2012/0159012 A1 | 6/2012 | Serizawa et al. | | |
| 2012/0254445 A1* | 10/2012 | Kawamoto | ........... | G06F 9/5088 709/226 |
| 2012/0303912 A1* | 11/2012 | Calder | ................. | G06F 3/0623 711/162 |
| 2012/0311603 A1* | 12/2012 | Kudo | .................... | G06F 3/0611 718/105 |
| 2013/0132617 A1 | 5/2013 | Serizawa et al. | | |
| 2013/0138908 A1* | 5/2013 | Iwasaki | ................ | G06F 3/0607 711/165 |
| 2014/0082229 A1 | 3/2014 | Serizawa et al. | | |
| 2015/0074222 A1* | 3/2015 | Liang | .................. | H04L 67/2842 709/214 |
| 2015/0088586 A1* | 3/2015 | Pavlas | ................ | G06F 9/45558 705/7.25 |
| 2015/0278243 A1* | 10/2015 | Vincent | ............. | G06F 17/30194 707/634 |
| 2015/0296169 A1* | 10/2015 | Saif | ......................... | H04N 5/77 386/224 |
| 2015/0319230 A1* | 11/2015 | Skjolsvold | ............ | H04L 67/101 709/224 |

* cited by examiner

500

| TENANT ID (501) | STORAGE APPARATUS ID (502) | VOLUME ID (503) |
|---|---|---|
| Ta | ST1 | Vol A |
| | | Vol B |
| | | Vol C |
| Tb | | Vol D |
| | | Vol E |
| | | Vol F |
| Tc | | Vol G |
| ... | ... | ... |

| I/O PROCESSING UNIT ID (601) | VOLUME ID (602) |
|---|---|
| P0 | Vol A |
| | Vol B |
| | Vol C |
| P1 | Vol D |
| | Vol E |
| | Vol F |
| P2 | Vol G |
| ... | ... |

| STORAGE APPARATUS ID | I/O PROCESSING UNIT ID | VOLUME ID | RESOURCE UTILIZATION RATIO | | | | | |
|---|---|---|---|---|---|---|---|---|
| | | | t1 | t2 | t3 | t4 | t5 | ... |
| ST1 | P0 | Vol A | 13% | 16% | 15% | 19% | 20% | ... |
| | | Vol B | 5% | 5% | 5% | 5% | 5% | ... |
| | | Vol C | 7% | 7% | 7% | 7% | 7% | ... |
| | P1 | Vol D | 17% | 17% | 17% | 12% | 12% | ... |
| | | Vol E | 12% | 12% | 12% | 12% | 12% | ... |
| | | Vol F | 6% | 6% | 6% | 6% | 6% | ... |
| | P2 | Vol G | ... | ... | ... | ... | ... | ... |
| ... | | | | | | | | |

COMPUTER SYSTEM AND LOAD LEVELING PROGRAM

BACKGROUND

This invention relates to a computer system configured to level loads and a load leveling program.

Hitherto, there have been storage systems in which a processor that handles a logical storage device is easily switched to another processor (see, for example, JP 2008-269424 A). In the storage system of JP 2008-269424 A, each host interface (I/F) unit has a management table that is used to manage which control unit handles the control of processing of inputting/outputting data to/from a storage area of a logical storage device. When a host computer makes a request to input/output data to/from a logical storage device, the host I/F unit refers to the management table to hand over the input/output request to a control unit that handles input/output processing of the logical storage device. A microprocessor of the control unit executes input/output processing as requested by the input/output request. The microprocessor of the control unit also determines whether or not the control unit that handles the processing of inputting/outputting data to/from the logical storage device is to be switched to another control unit. When determining that the control unit that handles the input/output processing is to be switched, the microprocessor of the control unit sets the management table so that another control unit that is not the one currently handling the logical storage device handles the processing of inputting/outputting data to/from the logical storage device.

JP 2008-269424 A discloses that a load balancing plan that is to switch from one control unit to another as the resource that handles the input/output processing of a logical storage device is set in the management table without being presented to an administrator. A problem of JP 2008-269424 A is that the administrator does not have a chance to check the propriety of the switching of the control unit that handles the input/output processing of the logical storage device.

SUMMARY

It is therefore an object of this invention to provide a chance to determine the propriety of a load balancing plan before a switch from one resource to another is made as the resource that handles the processing of inputting/outputting data to/from a logical storage device.

An aspect of the invention disclosed in this application is a computer system, comprising: a server configured to transmit an input/output processing request, which contains identification information for uniquely identifying one of a plurality of logical volumes each created from one or more storage devices; a storage apparatus comprising a plurality of input/output processing units capable of processing the input/output processing request, and the plurality of logical volumes; a management computer configured to manage the storage apparatus; and a particular processor configured to manage a particular resource group located along a path between the server and the plurality of logical volumes through which the input/output processing request is transmitted, wherein the particular processor is configured to: calculate a load balancing plan when a load on a first resource comprised in the particular resource group is excessive, in order to distribute a part of the load on the first resource to a second resource comprised in the particular resource group; output the load balancing plan in a manner that allows the load balancing plan to be displayed; and distribute the load on the first resource to the second resource by following the load balancing plan, when an instruction to execute the load balancing plan is received as a result of outputting the load balancing plan.

According to the exemplary embodiment of this invention, a chance to determine the propriety of a load balancing plan can be provided before a switch from one resource to another is made as the resource that handles the processing of inputting/outputting data to/from a logical storage device. Other features, aspects, and advantages of the subject matter will become apparent from the description, the drawings, and the claims.

BRIEF DESCRIPTION OF THE DRAWINGS

FIG. 5 is an explanatory diagram for illustrating an example of a tenant-volume association table, which is included in the system configuration information.

FIG. 6 is an explanatory diagram for illustrating an example of an I/O processing unit-volume association table, which is included in the system configuration information.

FIG. 12 is an explanatory diagram for illustrating an example of time-series information of the resource utilization ratios of the I/O processing units that is organized on a logical volume-by-logical volume basis.

DETAILED DESCRIPTION OF THE PREFERRED EMBODIMENTS

Figure 1:
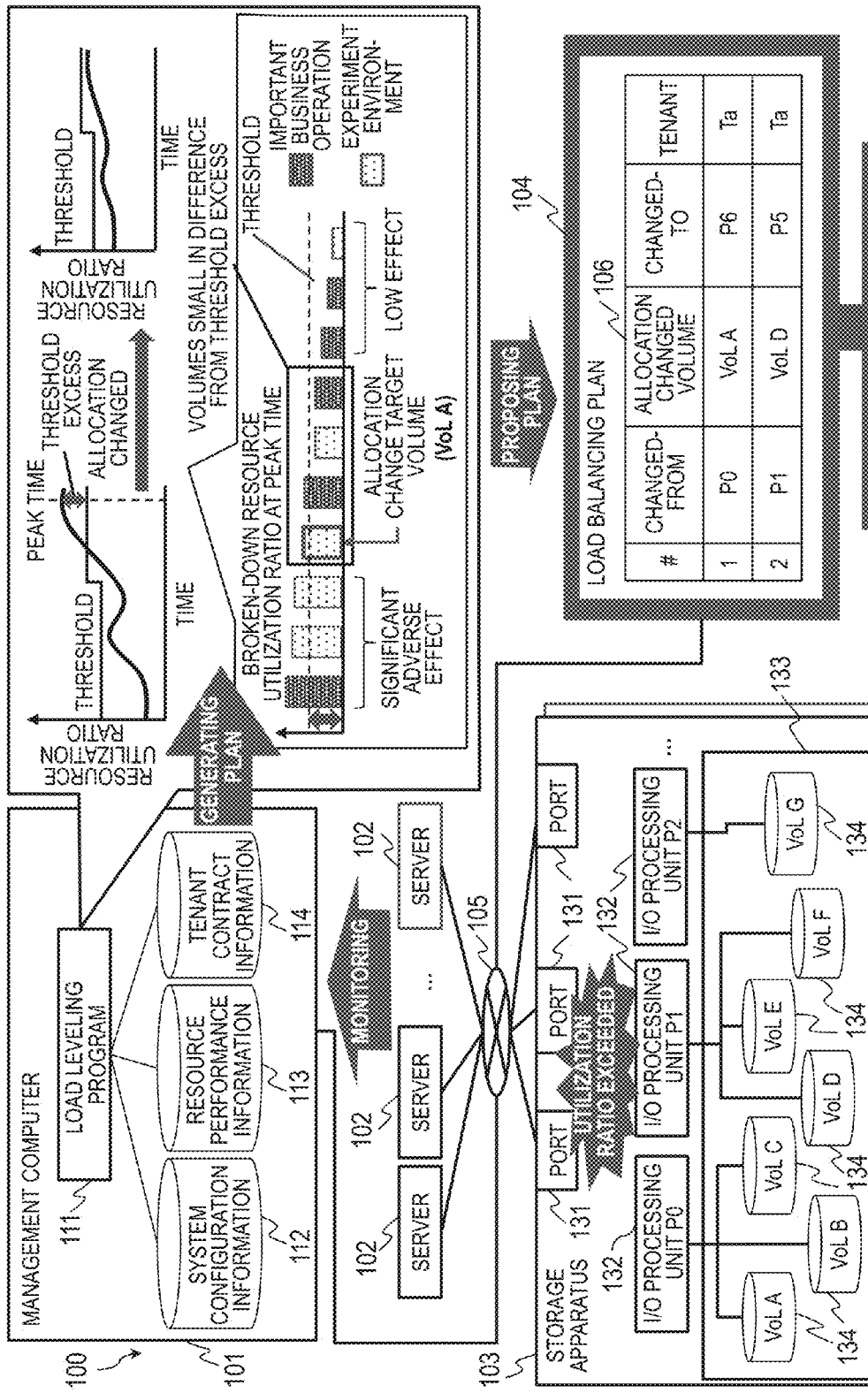
FIG. 1 is an explanatory diagram for illustrating an example of presenting a load balancing plan in a computer system according to an embodiment.

In the following description, although pieces of information of this invention are described by using such expressions as "aaa table", "aaa list", "aaa DB", and "aaa queue", those pieces of information may be expressed by data structures other than a table, a list, a DB, a queue, and the like. Therefore, "aaa table", "aaa list", "aaa DB", "aaa queue", and the like are sometimes referred to as "aaa information" in order to show that those pieces of information are independent of their data structures.

In addition, although such expressions as "identification information", "identifier", "name", "ID" are used in order to describe details of each piece of information, those expressions are interchangeable.

In the following description, although a description is given by using "program" as a subject in some cases, the program is executed by a processor to perform defined processing while using a memory and a communication port (communication control device). Therefore, the description given by using "program" as a subject may also be interpreted as a description given by using "processor" as a subject. Further, processing disclosed while a program is used as a subject may also be interpreted as processing performed by a computer such as a management server or an information processing apparatus. Further, a part or all of a program may also be implemented by dedicated hardware.

Further, various programs may also be installed onto each computer by a program distribution server or computer-readable memory media. The program distribution server in this case includes a processor and storage resources, and the storage resources store a distributing program and programs to be distributed. The processor of the program distribution server executes the distributing program, thereby distributing to other computers the programs to be distributed.

It should be noted that a computer according to an embodiment mode of this invention includes input/output devices. As examples of the input/output devices, a display, a keyboard, and a pointer device are conceivable, but the input/output devices may be other devices. Moreover, a serial interface or an Ethernet interface may be used as an input/output device as an alternative to the input/output devices, and input and display on the input/output devices may be substituted by coupling, to the interface, a computer for display including a display, a keyboard, or a pointer device, transmitting information for display to the computer for display, and receiving information for input from the computer for display, thereby performing display on the computer for display and receiving the input from the computer for display.

A set of at least one computer for monitoring a computer system and displaying information for display of the invention of this application is hereinafter sometimes referred to as "monitoring system". In a case where the monitoring computer displays the information for display, the monitoring computer is the monitoring system. Further, a combination of the monitoring computer and the computer for display is also the monitoring system. Further, processing equivalent to that of the monitoring computer may also be implemented by a plurality of computers in order to speed up monitoring processing and achieve a higher reliability, and in this case, the plurality of computers (including the computer for display in a case where the computer for display performs display) are the monitoring system.

<Load Balancing Plan Presentation Example>

FIG. 1 is an explanatory diagram for illustrating an example of presenting a load balancing plan in a computer system according to an embodiment. A computer system 100 is a system in which a management computer 101, servers 102, storage apparatus 103, and a display-use computer 104 are coupled via a network 105 in a manner that allows communication to and from one another.

The management computer 101 stores therein a load leveling program 111, system configuration information 112, resource performance information 113, and tenant contract information 114. The load leveling program 111 uses the system configuration information 112, the resource performance information 113, and the tenant contract information 114 to level loads on resources among which the load is to be balanced.

The system configuration information 112 defines the system configuration of the computer system 100, such as which storage apparatus 103 is coupled to which logical storage device (hereinafter referred to as "logical volume"). Details of the system configuration 112 are described later with reference to FIG. 3 to FIG. 8. The resource performance information 113 indicates the performance of resources such as changes with time of the utilization ratios of resources. Details of the resource performance information 113 are described later with reference to FIG. 9 to FIG. 12. The tenant contract information 114 defines the specifics of contracts of tenants 400. Each tenant 400 is an aggregation of the server 102 and software or a virtual machine that are prepared for a particular customer or service. Details of the tenant contract information 114 are described later with reference to FIG. 13 and FIG. 14.

Each server 102 is a computer that is a part of one of the tenants 400. The server 102 executes software or a virtual machine that is a part of the tenant 400. The server 102 accesses the storage apparatus 103 to read data out of the storage apparatus 103 and write data to the storage apparatus 103. Specifically, the server 102 specifies a logical volume by using a logical unit number (LUN), which is identification information for identifying one logical volume 134 uniquely, transmits an I/O processing request to the relevant storage apparatus 103, and accesses the specified logical volume.

The storage apparatus 103 store data. Each storage apparatus 103 includes ports 131, input/output (I/O) processing units 132, and a logical volume group 133. The ports 131 are coupled to the network 105 in order to input I/O processing requests from the servers 102 and output responses to the I/O processing requests to the servers 102.

Each I/O processing unit 132 includes therein a processor and a memory (not shown). The memory stores identification information of a logical volume handled by the I/O processing unit 132 to which the memory belongs. In the case where a load balancing plan dictates a switch from the current logical volume by assigning the I/O processing unit 132 a different logical volume to handle, the identification information of the logical volume handled by the I/O processing unit 132 is updated when an update request is made by the management computer 101. The I/O processing unit 132 is coupled to the logical volume that the I/O processing unit 132 handles. The I/O processing unit 132 receives an I/O processing request input from one of the ports 131, and accesses the logical volume that the I/O processing unit 132 handles to read data out of the logical volume or write data to the logical volume.

The logical volume group 133 is an aggregation of logical volumes 134. The logical volumes 134 are created from, for example, one or more storage devices. The storage device is a device configured to store data, and a type of the storage device is HDD devices such as Serial Attached Small Computer System Interface (SA SCSI: SAS) HDDs, Serial Advanced Technology Attachment (SATA) HDDs, and Fibre Channel (FC) HDDs. The storage device may instead be a type that uses a flash memory, a random access memory (RAM) having a backup function, an FeRAM, or other similar non-volatile memories. The following descriptions take a flash SSD (hereinafter simply referred to as "SSD") as an example of a storage device that uses one of the non-volatile memories given above. However, it is to be understood that the descriptions apply to a storage device that uses other types of non-volatile memory. The storage device can be coupled to any one of the I/O processing units 132.

The display-use computer 104 displays a load balancing plan 106, which is an example of calculation results sent from the management computer 101 over the network 105. The display-use computer 104, which is coupled to the management computer 101 via the network 105 in FIG. 1, may be coupled directly to the management computer 101. A display apparatus coupled to the management computer 101 may be used in place of the display-use computer 104.

An example of presenting the load balancing plan 106 in the computer system 100 is described next. The load balancing plan 106 is an allocation change plan for switching a resource that handles one logical volume 134 to another resource. Resources among which the load is to be balanced here are processors inside the I/O processing units 132. The management computer 101 monitors the computer system 100 and detects the I/O processing unit 132 whose resource utilization ratio exceeds a threshold.

In the case where the I/O processing unit 132 whose resource utilization ratio exceeds a threshold is detected, the load leveling program 111 of the management computer 101 identifies the utilization ratio of each resource at a peak time where the utilization ratio is maximum in a time slot where the threshold is exceeded. The load leveling program 111 then identifies the logical volume 134 the allocation of which is to be changed among the logical volume group 133. The logical volume 134 the allocation of which is to be changed is within a tolerable range of difference from the threshold. The logical volume 134 that is outside the tolerable range of difference from the threshold causes a significant adverse effect through an allocation change, or is low in the effect of load balancing through an allocation change, and is therefore not employed.

The load leveling program 111 generates the load balancing plan 106 in this manner. The load leveling program 111 outputs the generated load balancing plan 106 to the display-use computer 104. This enables the management computer 101 to present the load balancing plan 106 to an administrator before allocation is changed. The administrator can thus check the propriety of the load balancing plan 106 beforehand. In the case where the administrator determines that the load balancing plan 106 is not proper, an adverse effect on an important system can be avoided by adjusting the load balancing plan 106 to requirements such as the priority levels of respective business operations.

<Hardware Configuration Example of the Management Computer 101>

Figure 2:
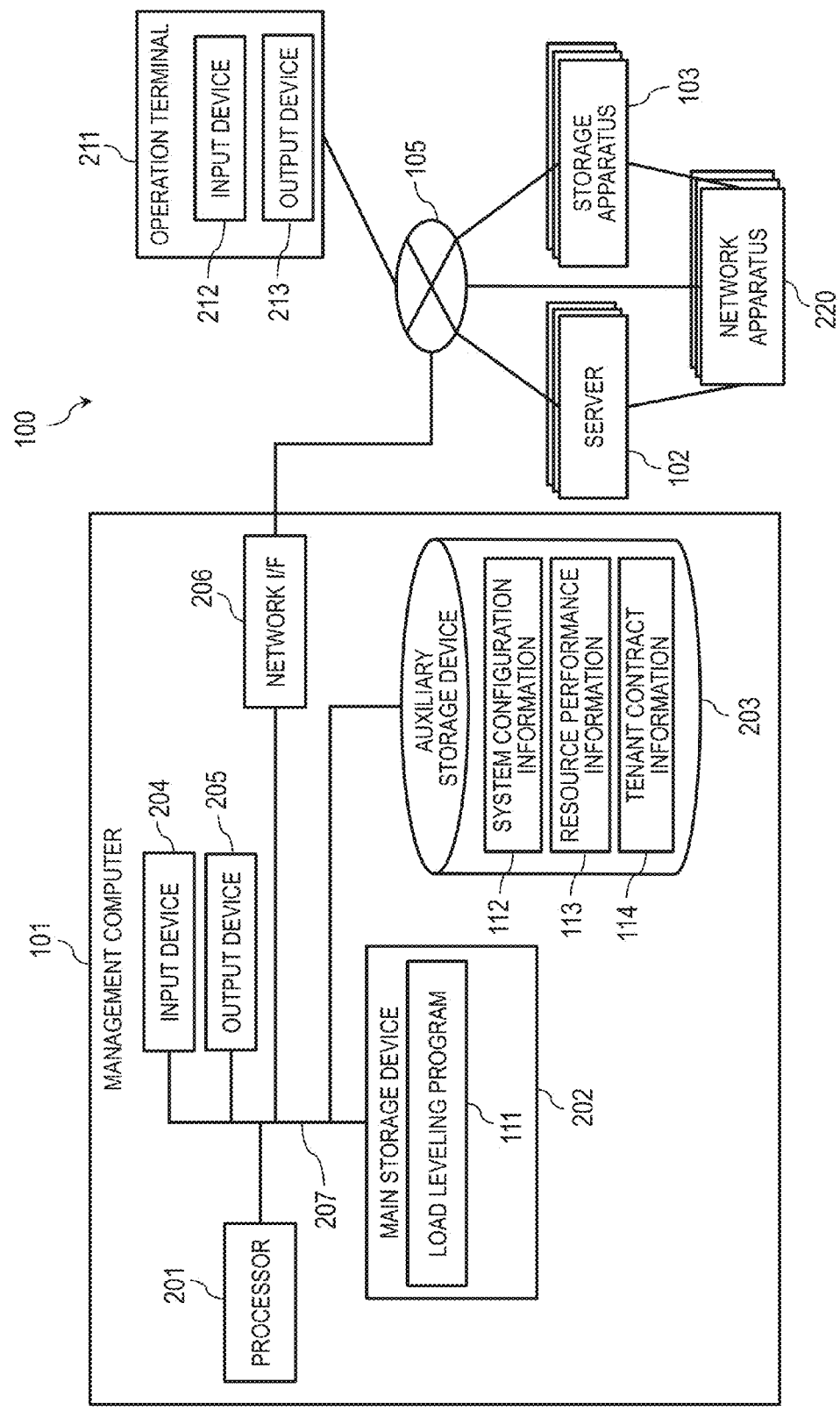
FIG. 2 is a block diagram for illustrating a hardware configuration example of the management computer 101.

FIG. 2 is a block diagram for illustrating a hardware configuration example of the management computer 101. Some components illustrated in FIG. 1 are omitted from FIG. 2. The management computer 101 includes a processor 201, a main storage device 202, an auxiliary storage device 203, an input device 204, an output device 205, and a network I/F 206. The processor 201, the main storage device 202, the auxiliary storage device 203, the input device 204, the output device 205, and the network I/F 206 are coupled to a bus 207.

The processor 201 executes the load leveling program 111. Processing of the load leveling program 111 may be executed by, for example, an integrated circuit or a similar piece of hardware instead of the processor 201. The main storage device 202 stores the load leveling program 111.

The auxiliary storage device 203 stores the system configuration information 112, the resource performance information 113, and the tenant contract information 114. The system configuration information 112, the resource performance information 113, and the tenant contract information 114 may be stored separately in different storage devices.

The auxiliary storage device 203 may be a storage device coupled to the management computer 101 via an I/F (not shown) that is an interface to an external apparatus outside the management computer 101, or via the network I/F 206. The main storage device 202 and the auxiliary storage device 203 may be the one same device.

The input device 204 is operated by the administrator to input data. The output device 205 is configured to display the result of executing the processor 201. The input device 204 and the output device 205 may be a unitary device.

An operation terminal 211 may be coupled to the computer system 100. The operation terminal 211 is a computer used to operate the management computer 101. The operation terminal 211 includes an input device 212 and an output device 213. The input device 212 is operated by the administrator to input data. The input data is transmitted to the management computer 101 over the network 105. The output device 213 is configured to display data sent from the management computer 101. The input device 212 and the output device 213 may be a unitary device.

The computer system 100 also includes network apparatus 220. The network apparatus 220 are configured to relay data between the servers 102 and the storage apparatus 103.

Figure 3:
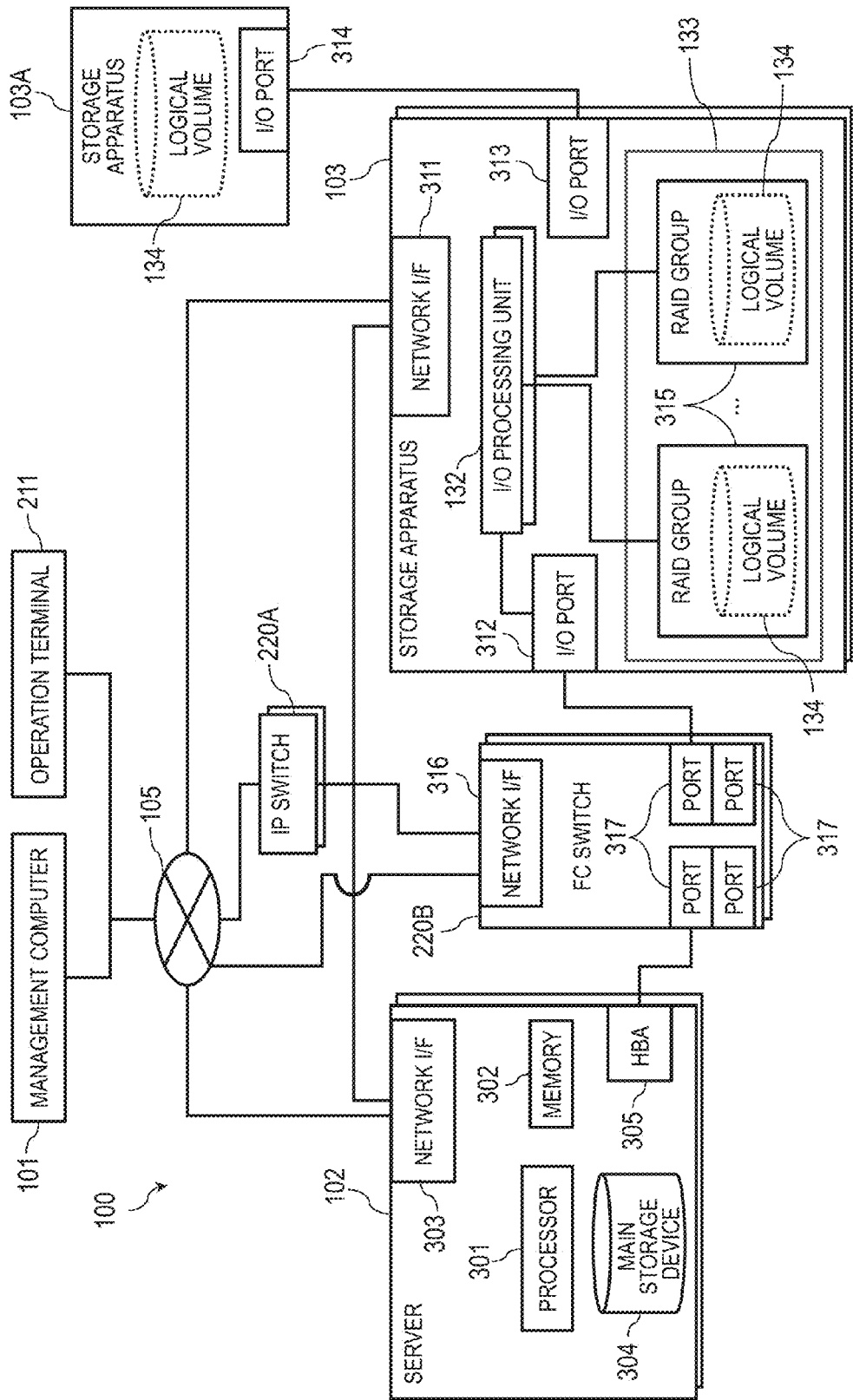
FIG. 3 is a block diagram for illustrating a system configuration example of a storage system.

FIG. 3 is a block diagram for illustrating a system configuration example of a storage system. The storage system is a system in which the servers 102, the storage apparatus 103, and the network apparatus 220 are coupled via the network 105 or a storage area network (SAN) in a manner that allows communication to and from one another.

The servers 102 are each a computer that includes a processor 301, a memory 302, a network I/F 303, a main storage device 304, and a host bus adapter (HBA) 305. The servers 102 are apparatus under management of the management computer 101. The servers 102 execute pieces of software or virtual machines that make up the tenants 400. The network I/F 303 is coupled to other network I/Fs 311 and 316, to an Internet Protocol (IP) switch 220A, which is an example of the network apparatus 220, and to the network 105. The HBA 305 is coupled to one of ports 317 of a Fibre Channel (FC) switch 220b, which is another example of the network apparatus 220.

The storage apparatus 103 are apparatus under management of the management computer 101, and provide storage capacity used by software that runs on the servers 102. Each storage apparatus 103 includes the I/O processing units 132, the network I/F 311, an I/O port 312, an I/O port 313, and the logical volume group 133. The network I/F 311 is an interface configured to couple the storage apparatus 103 to the network 105, which is, for example, a local area network (LAN) compliant with Ethernet, and includes the ports 131.

The I/O port 312 and the I/O port 313 are interfaces configured to couple the storage apparatus 103 to a SAN, for example, a Fibre Channel network. Each RAID group 315 provides a plurality of storage devices as one or more logical volumes 134 to the servers 102. The storage apparatus 103 may manage the logical volumes 134 that are located in an external storage apparatus 103A coupled to the storage apparatus 103 via the I/O port 313.

The IP switch 220A and the FC switch 220B are included among the plurality of network apparatus 220. The IP switch 220A is coupled to the network I/F 206 of the management computer 101, the network I/Fs 303 of the servers 102, the network I/Fs 311 of the storage apparatus 103, and the network I/F 316 of the FC switch 220B.

The FC switch 220B is configured to transfer data between the servers 102 and the storage apparatus 103. The FC switch 220B includes a plurality of ports 317. The ports 317 of the FC switch 220B are coupled to the HBAs 305 of the servers 102 and the I/O ports 312 of the storage apparatus 103. The network apparatus 220 may be apparatus under management of the management computer 101.

<System Configuration Information 112>

An example of the system configuration information 112 is described next with reference to FIG. 4 to FIG. 8.

Figure 4:
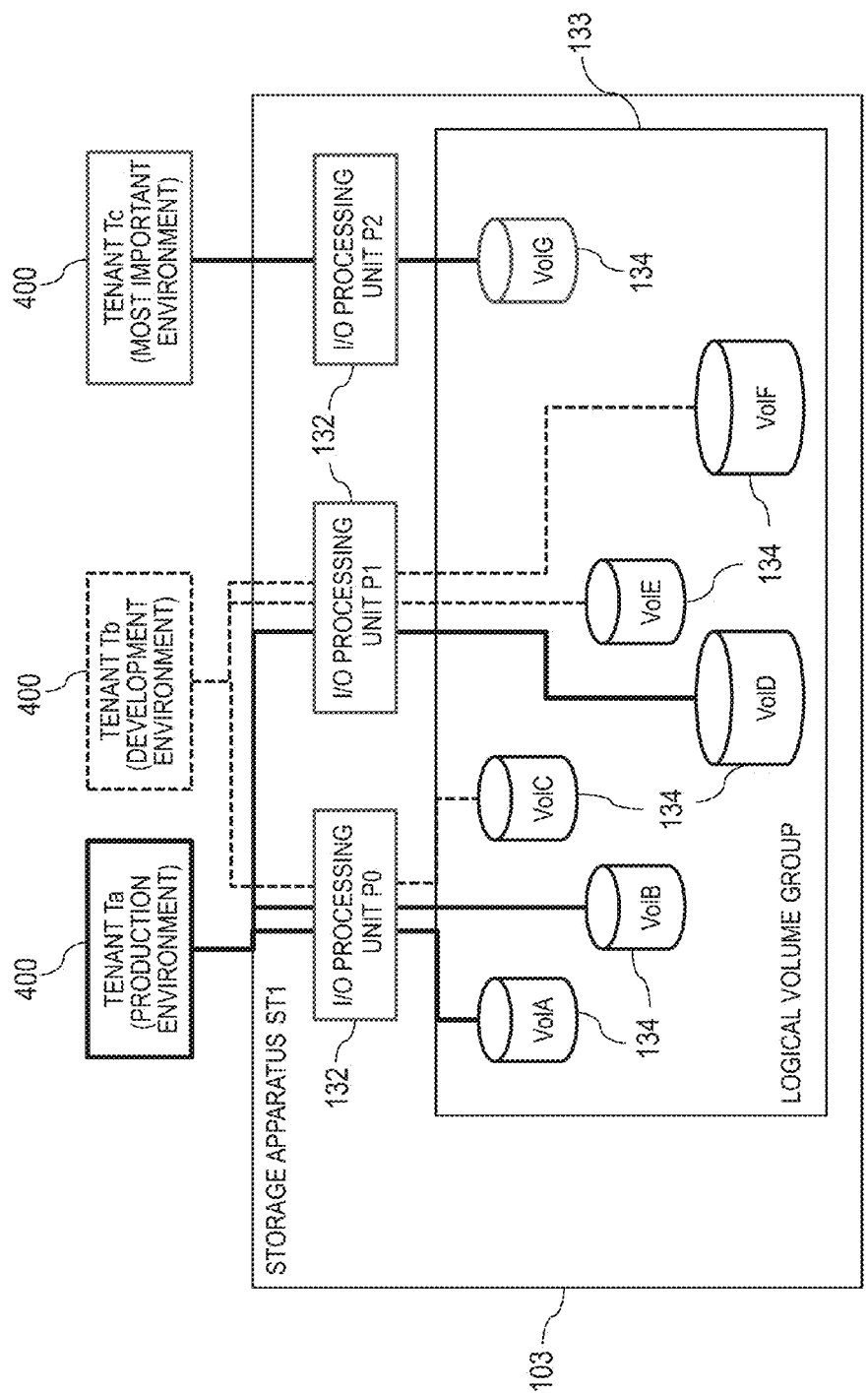
FIG. 4 is a schematic diagram for illustrating an example of relations between the tenants, the I/O processing units, and the logical volume group which are defined in the system configuration information.

FIG. 4 is a schematic diagram for illustrating an example of relations between the tenants 400, the I/O processing units 132, and the logical volume group which are defined in the system configuration information 112. Each tenant 400 is created from a combination of one of the servers 102 and software or a virtual machine that runs on the server 102. The tenants 400 may be classified by customers or by business operations or services of the same customer. In this example, a tenant Ta is the production environment, a tenant Tb is the development environment, and a tenant Tc is the most important environment.

Each storage apparatus 103 includes a plurality of (three, for example) I/O processing units 132. The logical volume group 133 includes, for example, logical volumes Vol A to Vol G.

An I/O processing unit P0 handles the logical volumes Vol A to Vol C. An I/O processing unit P1 handles the logical volumes Vol D to Vol F. An I/O processing unit P2 handles the logical volume Vol G.

FIG. 5 is an explanatory diagram for illustrating an example of a tenant-volume association table 500, which is included in the system configuration information 112. The tenant-volume association table 500 is information that associates each tenant 400 with some logical volumes 134. The tenant-volume association table 500 is prepared information. The tenant-volume association table 500 includes a tenant ID field 501, a storage apparatus ID field 502, and a volume ID field 503.

The tenant ID field 501 is an area in which a tenant ID is stored. A tenant ID is identification information for uniquely identifying one of the tenants 400. The storage apparatus ID field 502 is an area in which a storage apparatus ID is stored. A storage apparatus ID is identification information for uniquely identifying one of the storage apparatus 103.

The volume ID field 503 is an area in which a volume ID is stored. A volume ID is identification information for uniquely identifying one of the logical volumes 134. An LUN, for example, is used as a volume ID.

The first entry in FIG. 5 indicates that the tenant 400 that has a tenant ID "Ta" can access the logical volume 134 that has a volume ID "Vol A" inside the storage apparatus 103 that has a storage apparatus ID "ST1".

FIG. 6 is an explanatory diagram for illustrating an example of an I/O processing unit-volume association table 600, which is included in the system configuration information 112. The processing unit-volume association table 600 is information that associates the I/O processing units 132 with the logical volumes 134. The processing unit-volume association table 600 is prepared information, and is updated when the allocation of the I/O processing units 132 is changed. The processing unit-volume association table 600 includes an I/O processing unit ID field 601 and a volume ID field 602.

The I/O processing unit ID field 601 is an area in which an I/O processing unit ID is stored. An I/O processing unit ID is identification information for uniquely identifying one of the I/O processing units 132. The volume ID field 602 is, similarly to the volume ID field 503 illustrated in FIG. 5, an area in which a volume ID is stored.

The first entry in FIG. 6 indicates that the I/O processing unit 132 that has an I/O processing unit ID "P0" can access the logical volumes 134 that have volume IDs "Vol A", "Vol B", and "Vol C".

Figure 7:
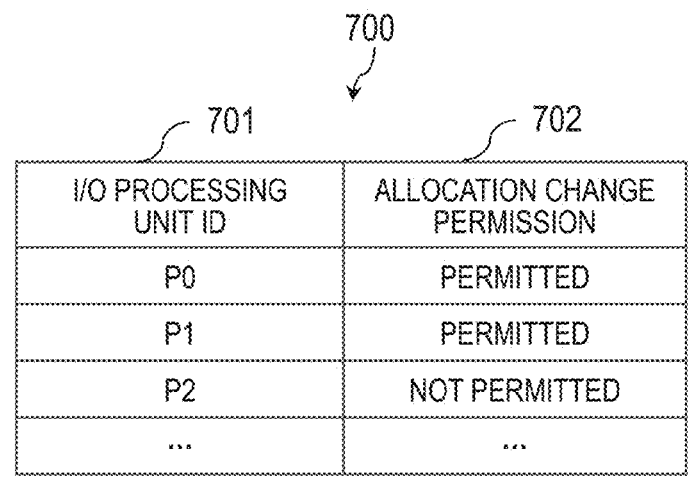
FIG. 7 is an explanatory diagram for illustrating an example of a load leveling permitted unit management table.

FIG. 7 is an explanatory diagram for illustrating an example of a load leveling permitted unit management table 700. The load leveling permitted unit management table 700 is information that defines the I/O processing units 132 for which the allocation of the logical volumes 134 to be handled by the I/O processing units 132 may be changed. The load leveling permitted unit management table 700 is prepared information, and can be changed any time from the input device 204 of the management computer 101 or from the external input device 212.

The load leveling permitted unit management table 700 includes an I/O processing unit ID field 701 and an allocation change permission field 702. The I/O processing unit ID field 701 is an area in which an I/O processing unit ID is stored. The allocation change permission field 702 is an area in which information indicating whether allocation change is permitted ("permitted" or "not permitted") with respect to the logical volumes 134 handled by the I/O processing unit 132 is stored. For example, the value of the allocation change permission field 702 is set to "not permitted" for the I/O processing unit P2, where I/O processing of the server 102 that is an important host is executed.

The management computer 101 executes processing of generating an allocation change plan that levels the load between the I/O processing units 132 for which the value "permitted" is set to the allocation change permission field 702. The I/O processing units P0 and P1 have "permitted" as the value of the allocation change permission field 702. The load leveling program 111 can therefore make a change so that, for example, the logical volume 134 that has been handled by the I/O processing unit P0 is handled by the I/O processing unit P1.

Figure 8:
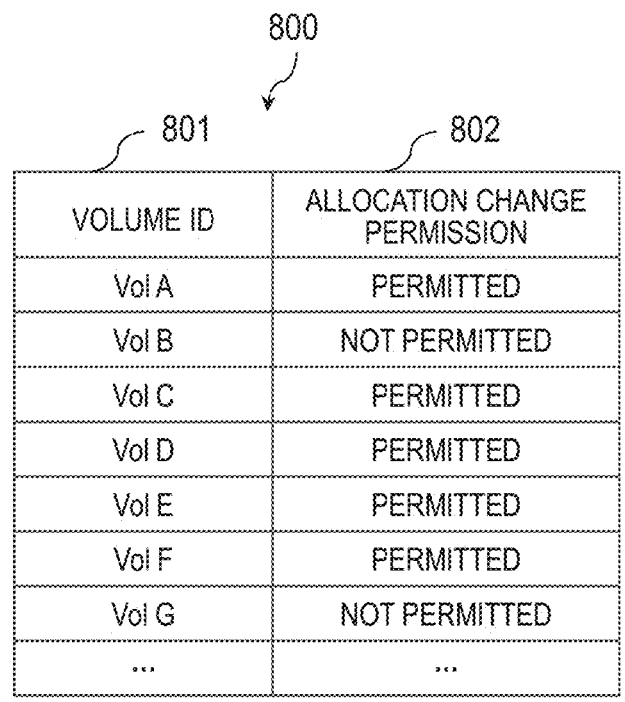
FIG. 8 is an explanatory diagram for illustrating an example of an allocation change permitted volume management table.

FIG. 8 is an explanatory diagram for illustrating an example of an allocation change permitted volume management table 800. The allocation change permitted volume management table 800 is information that defines the logical volumes 134 for which allocation change is permitted. The allocation change permitted volume management table 800 is prepared information, and can be changed any time from the input device 204 of the management computer 101 or from the external input device 212. The allocation change permitted volume management table 800 may be provided for each storage apparatus 103 separately.

The allocation change permitted volume management table 800 includes a volume ID field 801 and an allocation change permission field 802. The volume ID field 801 is an area in which a volume ID is stored. The allocation change permission field 802 is an area in which information indicating whether allocation change is permitted ("permitted" or "not permitted") for the logical volume 134 identified by the stored volume ID is stored. For example, "not permitted" is set as the value of the allocation change permission field 802 for the logical volume Vol B, which is used for I/O processing of the server 102 that is an important host.

<Resource Performance Information 113>

An example of the resource performance information 113 stored in the management computer 101 is described next with reference to FIG. 9 to FIG. 12.

Figure 9:
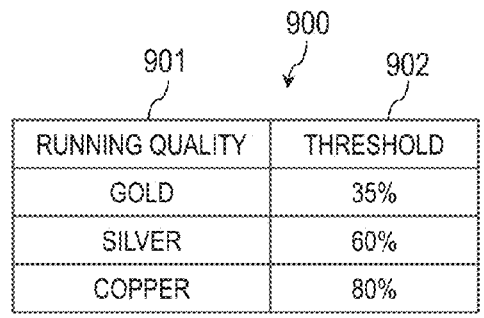
FIG. 9 is an explanatory diagram for illustrating an example of a running quality-threshold association table.

FIG. 9 is an explanatory diagram for illustrating an example of a running quality-threshold association table 900. The running quality-threshold association table 900 is information that defines, for each running quality, a threshold for the resource utilization ratio of the I/O processing units 132, which are under management of the management computer 101. The running quality-threshold association table 900 is prepared information, and can be changed any time from the input device 204 of the management computer 101 or from the external input device 212. The running quality-threshold association table 900 may be provided for each storage apparatus 103, or for each I/O processing unit 132.

The running quality-threshold association table 900 includes a running quality field 901 and a threshold field 902. The running quality field 901 is an area in which a running quality level is stored. The running quality is an index that indicates, for example, the level of fault tolerance of the storage apparatus 103. Examples of the running quality include "gold", "silver", and "copper". Of "gold", "silver", and "copper", "gold" is the highest running quality level, and "copper" is the lowest running quality level. The running quality is not limited to "gold", "silver", and "copper", i.e., three levels. The threshold field 902 is an area in which a threshold for the resource utilization of the I/O processing units 132, which are under management of the management computer 101. A lower threshold is set when the running quality level is higher.

Figure 10:
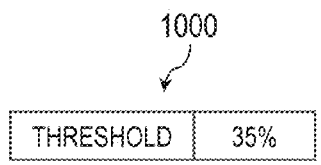
FIG. 10 is an explanatory diagram for illustrating an example of threshold information.

FIG. 10 is an explanatory diagram for illustrating an example of threshold information 1000. A threshold for the resource utilization ratio of the I/O processing units 132, which are under management of the management computer 101, is stored in the threshold information 1000. The threshold information 1000 is prepared information, and can be changed any time from the input device 204 of the management computer 101 or from the external input device 212. The threshold information 1000 may be provided for each storage apparatus 103, or for each I/O processing unit 132. A threshold may be stored for each time slot in the threshold information 1000.

Figure 11:
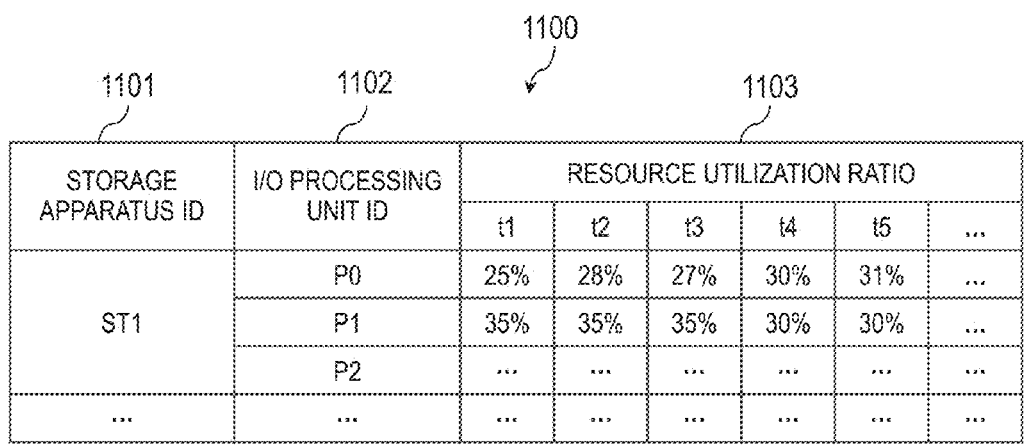
FIG. 11 is an explanatory diagram for illustrating an example of time-series information of the resource utilization ratios of the I/O processing units.

FIG. 11 is an explanatory diagram for illustrating an example of time-series information of the resource utilization ratios of the I/O processing units 132 (hereinafter referred to as "first resource utilization ratio information 1100"). In the first resource utilization ratio information 1100, transitions with time of the resource utilization ratios of the I/O processing units 132 are stored. The first resource utilization ratio information 1100 includes a storage apparatus ID field 1101, an I/O processing unit ID field 1102, and a resource utilization ratio field 1103.

The storage apparatus ID field 1101 is an area in which a storage apparatus ID is stored. The I/O processing unit ID field 1102 is an area in which an I/O processing unit ID is stored. The resource utilization ratio field 1103 is an area in which the resource utilization ratios of the identified I/O processing unit 132 at given time intervals are stored. For example, the management computer 101 receives a resource utilization ratio from the identified I/O processing unit 132 at given time intervals, and stores the received resource utilization ratio in the first resource utilization ratio information 1100.

FIG. 12 is an explanatory diagram for illustrating an example of time-series information of the resource utilization ratios of the I/O processing units 132 that is organized on a logical volume 134-by-logical volume 134 basis (hereinafter referred to as "second resource utilization ratio information 1200"). The second resource utilization ratio information 1200 is created by breaking down the first resource utilization ratio information 1100 into the resource utilization ratios of the respective logical volumes 134. The second resource utilization ratio information 1200 includes a storage apparatus ID field 1201, an I/O processing unit ID field 1202, a volume ID field 1203, and a resource utilization ratio field 1204.

The storage apparatus ID field 1201 is an area in which a storage apparatus ID is stored. The I/O processing unit ID field 1202 is an area in which an I/O processing unit ID is stored. The volume ID field 1203 is an area in which a volume ID is stored. The resource utilization ratio field 1204 is an area in which the resource utilization ratios of the identified I/O processing unit 132 at given time intervals are stored. For example, the management computer 101 receives the resource utilization ratio of each relevant logical volume 134 from the identified I/O processing units 132 at given time intervals, and stores the received resource utilization ratio in the second resource utilization ratio information 1200.

<Tenant Contract Information 114>

An example of the tenant contract information 114 stored in the management computer 101 is described next with reference to FIG. 13 and FIG. 14.

Figure 13:
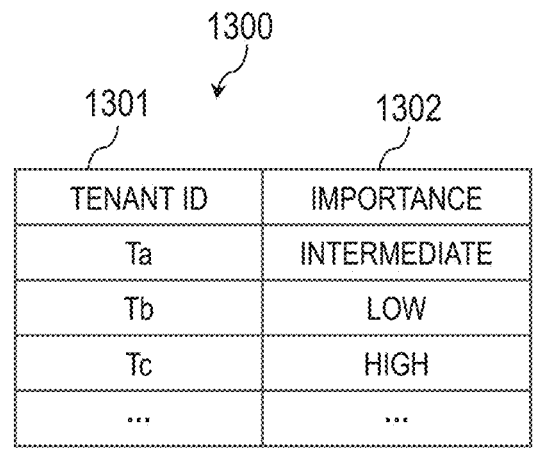
FIG. 13 is an explanatory diagram for illustrating an example of a tenant importance management table.

FIG. 13 is an explanatory diagram for illustrating an example of a tenant importance management table 1300. The tenant importance management table 1300 is used to manage, for each tenant 400, the level of importance of the tenant 400. The tenant importance management table 1300 is prepared information, and can be changed any time from the input device 204 of the management computer 101 or from the external input device 212.

A tenant ID field 1301 is an area in which a tenant ID is stored. A tenant ID is identification information for uniquely identifying one of the tenants 400. The importance field 1302 is an area in which the level of importance of the tenant 400 identified by the stored tenant ID is stored.

Figure 14:
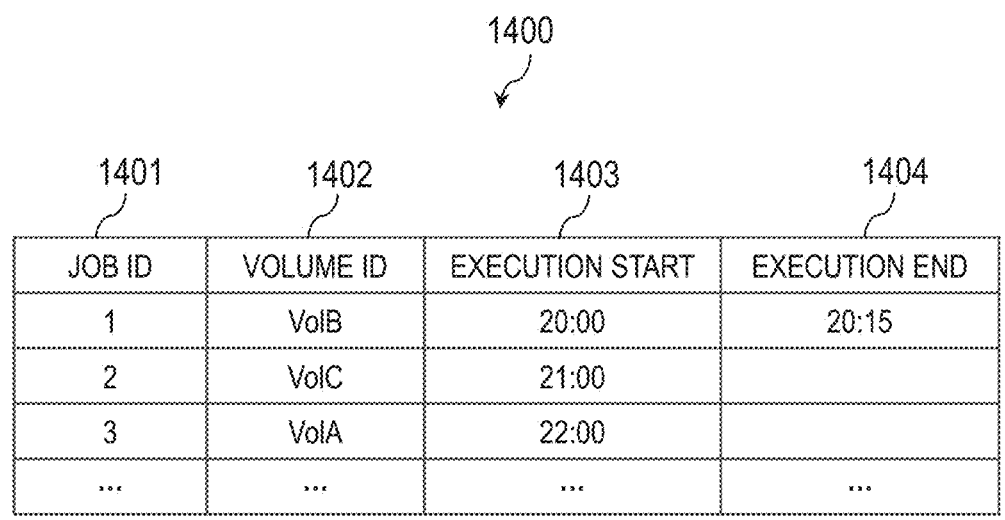
FIG. 14 is an explanatory diagram for illustrating an example of a job management table.

FIG. 14 is an explanatory diagram for illustrating an example of a job management table 1400. The job management table 1400 is used to manage the execution state of a job that is management processing executed in the storage apparatus 103. The job management table 1400 includes a job ID field 1401, a volume ID field 1402, an execution start field 1403, and an execution end field 1404.

The job ID field 1401 is an area in which a job ID is stored. A job ID is identification information for uniquely identifying a job. The volume ID field 1402 is an area in which a volume ID is stored. The execution start field 1403 is an area in which an execution start time is stored. The execution start time is a time at which the execution of a job identified by the stored job ID is started with the use of the logical volume 134 identified by the stored volume ID. The execution end field 1404 is an area in which an execution end time is stored. The execution end time is a time at which the execution of the job identified by the stored job ID is ended. The execution end field 1404 is blank before the job is finished.

<Load Leveling Processing of the Management Computer 101>

Load leveling processing of the management computer 101 is described next. The load leveling processing is executed by executing the load leveling program 111, which is stored in the management computer 101, with the processor 201.

Figure 15:
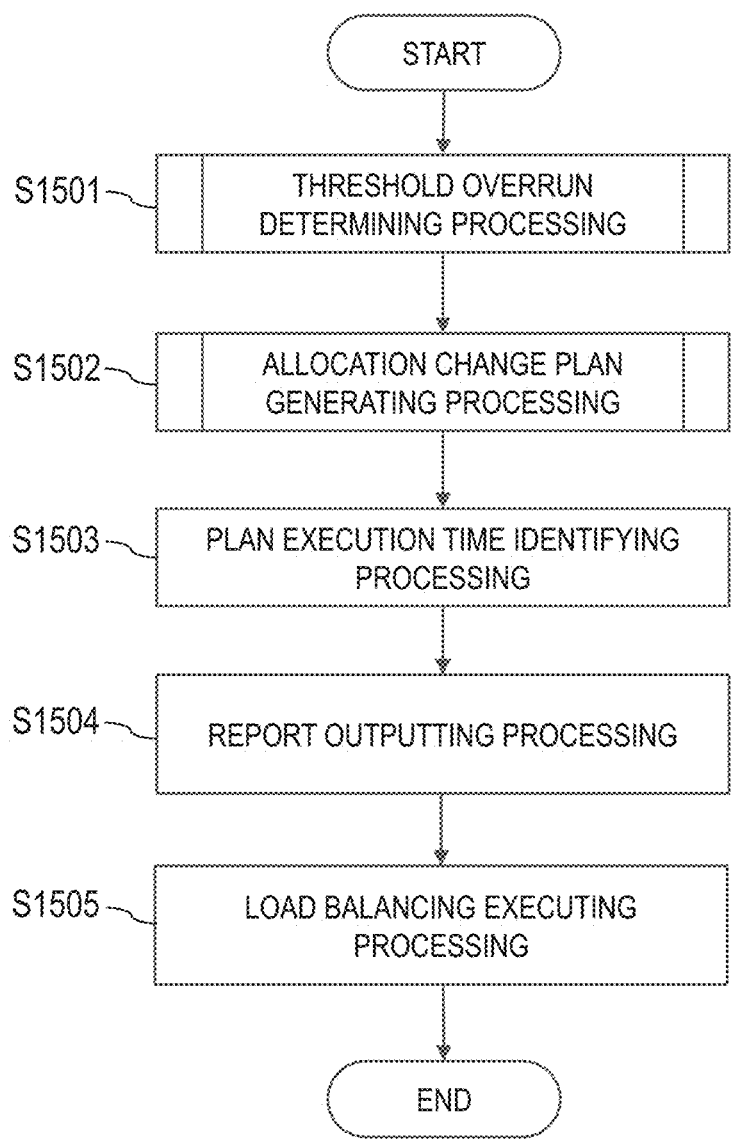
FIG. 15 is a flow chart for illustrating an example of processing procedures that are steps of the load leveling processing of the management computer.

FIG. 15 is a flow chart for illustrating an example of processing procedures that are steps of the load leveling processing of the management computer 101. A trigger for executing the processing of this flow chart is described first.

The load leveling processing, which follows this flow chart, may be executed when an instruction from the administrator is input through the input device 204 of the management computer 101. The load leveling processing may also be executed when the management computer 101 detects a scale-up.

For example, the execution of the load leveling processing following this flow chart may be started when a scale-up of one of the servers 102 is detected. An example of this scale-up is a case where CPU resources improve (e.g., a drop of the CPU utilization ratio to a threshold or lower) in a virtual machine running on the server 102 that is a part of one of the tenants 400, which are under management of the management computer 101.

Other examples of the scale-up of the server 102 include an increase in the number of processors, HBAs, memories inside the server 102 and, in the case where clusters are formed from a plurality of servers 102, the addition of the server 102 to a cluster. Any scale-up causes an increase in I/O processing requests from the server 102, and can therefore be a trigger for an additional load on relevant resources (for example, the I/O processing units 132).

The execution of the load leveling processing following this flow chart may also be started when the management computer 101 detects a scale-up of one of the logical volumes 134. An example of this scale-up is a case where a change is made to the RAID group 315 that forms the logical volume 134. The change may improve the limit performance (an example of the performance is input/output per second (IOPS)) of the logical volume 134, and can consequently be a trigger for an additional load on other resources (e.g., the I/O processing units 132). The "change to the RAID group 315 that forms the logical volume 134" includes, for example, a first pattern where a first RAID group 315, which originally forms the logical volume 134, is newly joined by a second RAID group as RAID groups that form the logical volume 134, or is replaced by the second RAID group, and a second pattern where the configuration of the first RAID group 315 itself is changed.

An example of the first pattern is a case in which the RAID group 315 that is made up of storage devices of an intermediate or low (in comparison) tier, such as FC HDDs, SAS HDDs, or SATA HDDs, is replaced by tier control with the RAID group 315 that is made up of storage devices of an upper tier, such as SSDs, as the RAID group 315 that forms a given logical volume 134. This replacement can be conducted in units of a logical volume to replace the whole RAID group 315 that forms the logical volume, or replacement in units of a partial area may be employed in which the storage area of a logical volume is divided into a plurality of partial areas, and the RAID group is replaced on a partial area-by-partial area basis. The same applies to the joining of a new RAID group to the original RAID group.

Particularly in the case of SSDs, which do not require head seek time in random read, the replacement/joining as this is one of important triggers for load leveling because, while the IOPS performance of SSDs is much superior to the IOPS performance of HDD devices, SSDs can cause loads on other resources. One way to detect the replacement/joining is detecting a change in configuration as this. In the case where logical volumes are created with the use of a pool, the replacement/joining may be detected by detecting a change in the ratio of different types of storage devices that make up a given logical volume 134.

Examples of the second pattern include a case in which the RAID level is changed by changing the configuration of the RAID group 315 itself, and a case in which the number of storage devices that make up the RAID group 315 is increased.

The scale-up of the server 102 and the scale-up of the logical volume 134 increase the I/O processing amount of the storage, and a resultant rise in the resource utilization ratios of the I/O processing units 132 is expected. The management computer 101 accordingly sets a resource utilization ratio that is higher by a given amount, for example, 1.2 times, to the I/O processing unit 132 that is allocated the logical volume 134 used by the server 102 where the scale-up has been detected. In the case of the scale-up of the logical volume 134, the management computer 101 sets a resource utilization ratio that is higher by a given amount, for example, 1.2 times, to the I/O processing unit 132 that is allocated the logical volume 134 where the scale-up has been detected. This gives a margin between the resource utilization ratio and a threshold. When the scale-up of the server 102 or the scale-up of the logical volume 134 raises the resource utilization ratio of the relevant I/O processing unit 132, the margin prevents the resource utilization ratio of the I/O processing unit 132 from exceeding the threshold.

In FIG. 15, the management computer 101 executes threshold overrun determining processing (Step S1501), allocation change plan generating processing (Step S1502), plan execution time identifying processing (Step S1503), report outputting processing (Step S1504), and load balancing executing processing (Step S1505). The threshold overrun determining processing (Step S1501) and the plan execution time identifying processing (Step S1504) do not always need to be executed.

The threshold overrun determining processing (Step S1501) is processing of determining whether or not the I/O processing unit 132 in question exceeds a threshold for the resource utilization ratio. When it is determined in the threshold overrun determining processing (Step S1501) that the I/O processing unit 132 does not exceed the threshold, the management computer 101 does not need to execute the subsequent processing steps (Steps S1502 to S1504). When it is determined in the threshold overrun determining processing (Step S1501) that the I/O processing unit 132 exceeds the threshold, the management computer 101 executes the subsequent processing steps (Steps S1502 to S1504). The threshold used in the threshold overrun determining processing (Step S1501) is a threshold stored in the running quality-threshold association table 900 or the threshold information 1000. Details of the threshold overrun determining processing (Step S1501) are described later with reference to FIG. 16.

In the allocation change plan generating processing (Step S1502), the management computer 101 generates an allocation change plan and writes the allocation change plan to the main storage device 202 or the auxiliary storage device 203. An allocation change plan includes one or more allocation change ideas in each of which the allocation of one logical volume 134 is changed once (an allocation change idea is a combination of the I/O processing unit 132 from which the allocation of one logical volume 134 is changed, the logical volume 134 the allocation of which is changed, and the I/O processing unit 132 to which the allocation of the logical volume 134 is changed). Details of the allocation change plan generating processing (Step S1502) are described later with reference to FIG. 17.

In the plan execution time identifying processing (Step S1503), the management computer 101 identifies a time at which the allocation change plan generated in the allocation change plan generating processing (Step S1502) is executed.

An allocation change plan includes, for example, a first allocation change idea and a second allocation change idea. The first allocation change idea is, for example, changing the allocation of the logical volume Vol A from the I/O processing unit P0 to the I/O processing unit P1. The second allocation change idea is, for example, changing the allocation of the logical volume Vol B from the I/O processing unit P2 to the I/O processing unit P1. In this case, executing the first allocation change idea and the second allocation change idea at the same time causes concurrent increases in the load of allocation changing processing on the I/O processing units P0 to P2, which adversely affects the I/O processing performance of the relevant storage apparatus 103.

The management computer 101 therefore identifies in the plan execution time identifying processing (Step S1503) a time point in a time slot in which the load is light (for example, a time point at which the load is lightest) as the allocation change execution time of the I/O processing unit 132 for which allocation change is executed. When the allocation change plan includes a plurality of allocation change ideas in each of which the allocation of one logical volume 134 is changed once, the management computer 101 identifies the allocation change execution time points so that the respective allocation change ideas are executed at different time points.

Specifically, the management computer 101 identifies the trend of resource utilization ratio transitions from, for example, statistical information about the past resource utilization ratio of the I/O processing unit 132 over a given period. The management computer 101 then identifies the trend of the load, e.g., the load drops to a given value or lower on Saturday and Sunday every week", and the load drops to a given value or lower at night every day". The management computer 101 identifies a time at which the load is lightest in a time slot that fits the identified trend of the load within the most recent period of several days to several hours.

The administrator may set an arbitrary execution time instead of executing the plan execution time identifying processing (Step S1503). The plan execution time identifying processing (Step S1503) may not be executed also when an allocation change plan that remedies the threshold overrun state of the I/O processing unit 132 cannot be generated in the allocation change plan generating processing (Step S1502). The management computer 101 writes the allocation change plan execution time to the main storage device 202 or the auxiliary storage device 203.

In the report outputting processing (Step S1504), the management computer 101 outputs the allocation change plan generated in the allocation change plan generating processing (Step S1502) and the time identified in the plan execution time identifying processing (Step S1503) to the output device 205 of the management computer 101 or to the display-use computer 104.

The management computer 101 may create and display a graph in the report outputting processing (Step S1504) in which the resource utilization ratio of the I/O processing unit 132 before the allocation change is organized with the use of the first resource utilization ratio information 1100. The management computer 101 may also create and display a graph in which the resource utilization ratio of the I/O processing unit 132 after the allocation change is organized as a result of executing a simulation for the post-allocation change configuration under the same conditions as before the allocation change. The management computer 101 may display the two graphs by superimposing one on the other. This enables the administrator to intuitively grasp a change made to the resource utilization ratio by the allocation change.

In the case where an allocation change plan that remedies the threshold overrun state of the I/O processing unit 132 cannot be generated in the allocation change plan generating processing (Step S1502), the management computer 101 outputs other countermeasures than an allocation change plan. The management computer 101 thus prompts the administrator to take action. For example, in the case where the resource utilization threshold of the I/O processing unit 132 is lower than 80% and it is determined that easing the threshold does not lead directly to a performance failure, the management computer 101 outputs proposition information about easing the threshold. In the case where other jobs than I/O processing, e.g., data copying processing, are being executed at the time when the threshold is exceeded, the jobs being executed are the cause of the threshold overrun of the utilization ratio of the I/O processing unit 132. The management computer 101 may therefore output proposition information about changing the execution time of the jobs.

An upper limit to I/O processing (not shown) may be held for each tenant 400 as a part of the tenant contract information 114. In this case, when one of the tenants 400 is issuing I/O processing requests above its upper I/O processing limit at the time when the resource utilization ratio of the I/O processing unit 132 exceeds the threshold, the management computer 101 may output proposition information for restricting I/O processing requests above the upper I/O processing limit. The management computer 101 may also hold information for managing the components of each storage apparatus 103. In this case, when, for example, the I/O processing units 132 can be added to the storage apparatus 103, the management computer 101 may output proposition information about adding the I/O processing units 132.

In the load balancing executing processing (Step S1505), the management computer 101 executes load balancing processing by following the allocation change plan.

<Threshold Overrun Determining Processing (Step S1501)>

Figure 16:
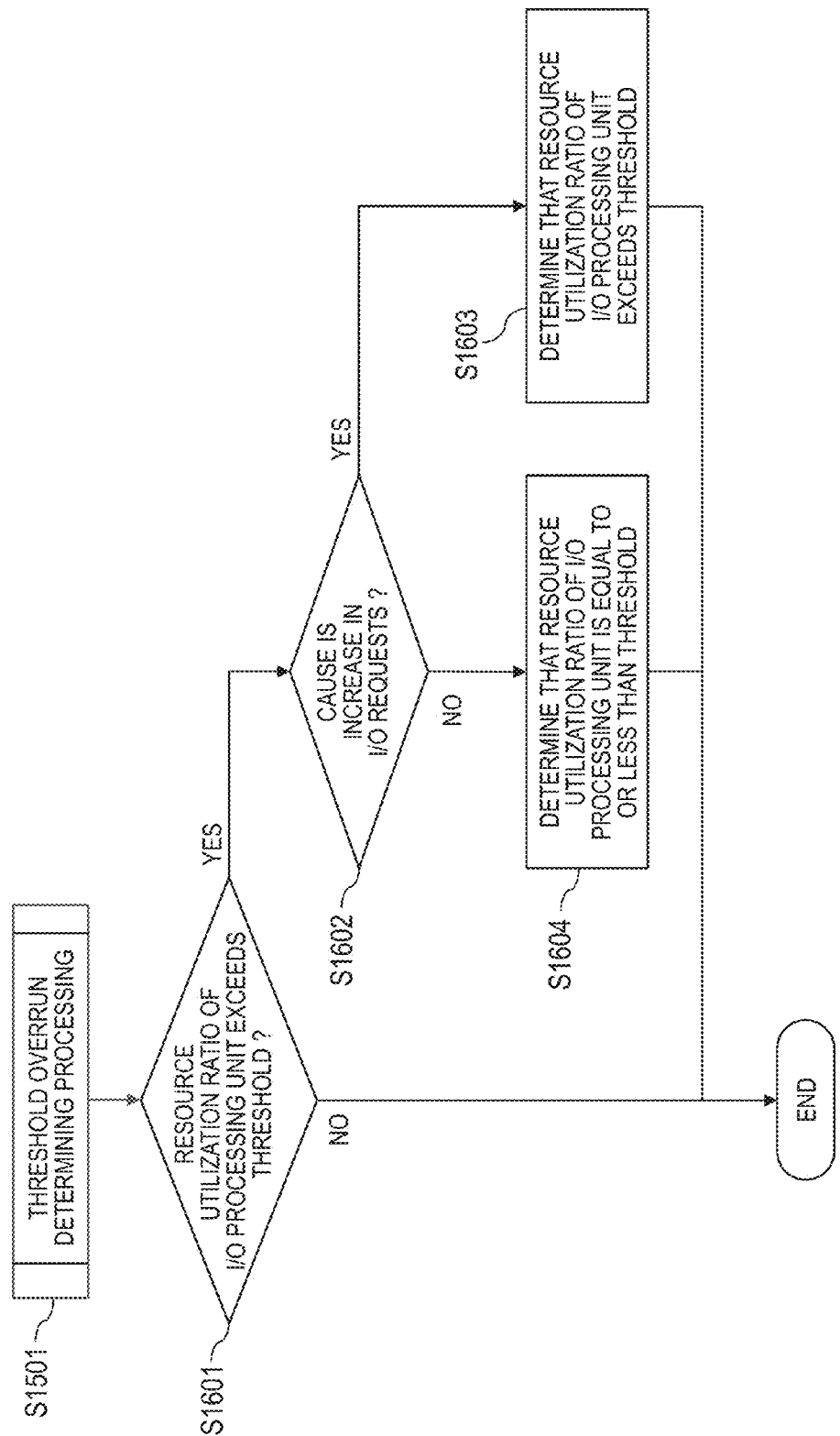
FIG. 16 is a flow chart for illustrating an example of detailed processing steps of the threshold overrun determining processing (Step S1501), which is illustrated in FIG. 15.

FIG. 16 is a flow chart for illustrating an example of detailed processing steps of the threshold overrun determining processing (Step S1501), which is illustrated in FIG. 15.

The storage apparatus 103 sometimes uses the I/O processing units 132 for other purposes than dealing with I/O processing requests from the servers 102, for example, executing such jobs as the transmission of performance information of the storage apparatus 103 to the management computer 101, and data copying. An increase in load on the I/O processing units 132 that is caused by other jobs than I/O processing requests from the servers 102 drops in a short period of time. The management computer 101 does not need to execute allocation change in such cases. The management computer 101 accordingly determines in the threshold overrun determining processing (Step S1501) whether the I/O processing unit 132 in question exceeds the threshold due to an increase in I/O processing requests. The threshold overrun determining processing (Step S1501) is executed for each I/O processing unit 132 separately.

In FIG. 16, the management computer 101 determines whether or not the resource utilization ratio of the I/O processing unit 132 that is the target of threshold overrun determination exceeds the threshold (Step S1601). In the case where the threshold is not exceeded (Step S1601: No), the management computer 101 ends the threshold overrun determining processing (Step S1501) for the I/O processing unit 132 that is the threshold overrun determination target.

In the case where the threshold is exceeded (Step S1601: Yes), on the other hand, the management computer 101 determines whether the cause of the threshold overrun is an increase in I/O processing requests (Step S1602). Specifically, the management computer 101 determines, for example, whether or not the number of I/O processing requests to all logical volumes 134 handled by the I/O processing unit 132 that is the threshold overrun determination target is equal to or larger than a given number. When the I/O processing request count is equal to or larger than the given number, an increase in I/O processing requests is determined as the cause of the threshold overrun of the resource utilization ratio of the I/O processing unit 132 that is the threshold overrun determination target.

When it is determined that the cause of the threshold overrun is an increase in I/O processing requests (Step S1602: Yes), the management computer 101 determines that the resource utilization ratio of the I/O processing unit 132 that is the threshold overrun determination target exceeds the threshold, and stores the result of the determination in the main storage device 202 or the auxiliary storage device 203 (Step S1603). The management computer 101 thus ends the threshold overrun determining processing (Step S1501) for this I/O processing unit 132.

In the case where the number of I/O processing requests to all logical volumes 134 handled by the I/O processing unit 132 that is the threshold overrun determination target is smaller than the given number, for example, an increase in I/O processing requests is not the cause of the threshold overrun of the resource utilization ratio of the I/O processing unit 132 that is the threshold overrun determination target. This means that the resource utilization ratio of the I/O processing unit 132 that is the threshold overrun determination target exceeds the threshold due to other jobs than I/O processing in the I/O processing unit 132 that is the threshold overrun determination target, such as back end processing and aggregation processing. In other words, because I/O processing is not the direct cause of the threshold overrun of the resource utilization ratio, the resource utilization ratio of the I/O processing unit 132 that is the threshold overrun determination target drops to the threshold or lower once the execution of the jobs is ended.

For that reason, when it is determined that the cause of the threshold overrun is not an increase in I/O processing requests (Step S1602: No), the management computer 101 determines that the resource utilization ratio of the I/O processing unit 132 that is the threshold overrun determination target is substantially equal to or less than the threshold, and stores the result of the determination in the main storage device 202 or the auxiliary storage device 203 (Step S1604). The management computer 101 in this case sets the resource utilization ratio of the I/O processing unit 132 that is the threshold overrun determination target to a value smaller than the threshold. This ensures that only the I/O processing units 132 that exceed the resource utilization threshold are identified in Step S1720 of the allocation change plan generating processing (Step S1502), which is described later. The management computer 101 thus ends the threshold overrun determining processing (Step S1501) for this I/O processing unit 132.

<Allocation Change Plan Generating Processing (Step S1502)>

Figure 17:
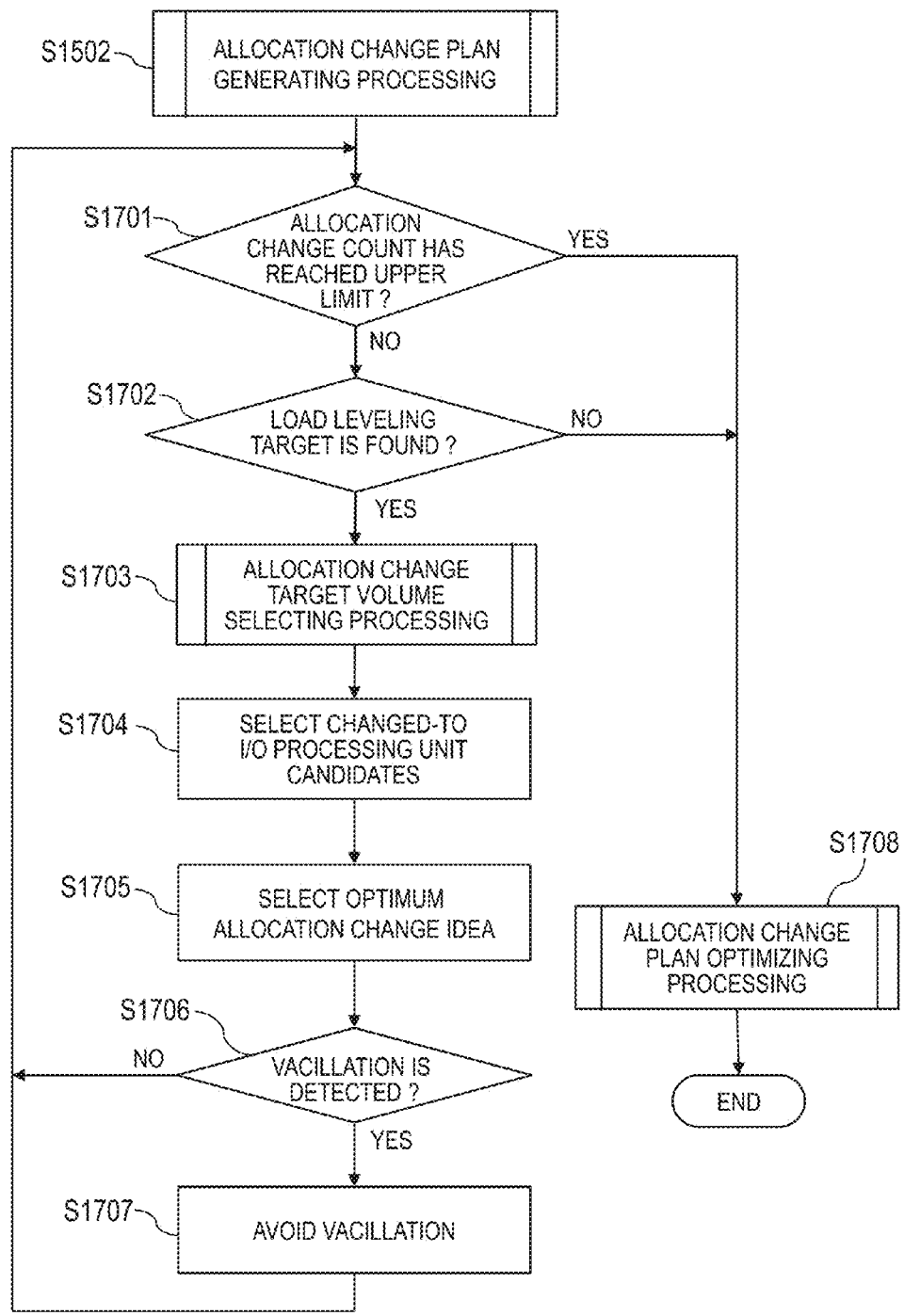
FIG. 17 is a flow chart for illustrating an example of detailed processing steps of the allocation change plan generating processing (Step S1502), which is illustrated in FIG. 15.

FIG. 17 is a flow chart for illustrating an example of detailed processing steps of the allocation change plan generating processing (Step S1502), which is illustrated in FIG. 15.

In the allocation change plan generating processing (Step S1502), the management computer 101 generates allocation change plans that remedy the threshold overrun state of the I/O processing unit 132, without checking every combination of one I/O processing unit 132 and one logical volume 134, and further generates, from among the allocation change plans, an allocation change plan that is small in the number of times allocation change is executed.

The management computer 101 first determines whether or not the allocation change count has reached an upper limit (Step S1701). The allocation change count is the number of times Step S1705 has been executed. The upper limit is set in advance. The upper limit is set because there are cases where threshold overrun cannot be solved no matter how many times allocation change is repeated.

In the case where the upper limit has not been reached (Step S1701: No), the management computer 101 proceeds to Step S1702. When the upper limit is reached (Step S1701: Yes), the management computer 101 proceeds to Step S1708.

In the case where the allocation change count has not reached the upper limit (Step S1701: No), the management computer 101 determines whether or not there are I/O processing units 132 that have not been selected as a load leveling target (Step S1702). A load leveling target is the I/O processing unit 132 that has been determined as a threshold overrun unit in the threshold overrun determining processing (Step S1501) and that has "permitted" as the value of the allocation change permission field 702 in the load leveling permitted unit management table 700. Accordingly, the I/O processing unit 132 that is determined as a threshold overrun unit in the threshold overrun determining processing (Step S1501) but has "not permitted" as the value of the allocation change permission field 702 in the load leveling permitted unit management table 700 does not make a load leveling target.

In the case where no load leveling target I/O processing unit 132 is left unselected (Step S1702: No), the management computer 101 proceeds to Step S1708. In the case where I/O processing units 132 that have not been selected as a load leveling target are found (Step S1702: Yes), the management computer 101 selects one of the unselected I/O processing units 132 and executes allocation change target selecting processing (Step S1703). In the allocation change target selecting processing (Step S1703), the management computer 101 selects candidates for the logical volume 134 the allocation of which is to be changed. Details of the allocation change target selecting processing (Step S1703) are described later with reference to FIG. 18.

After the allocation change target selecting processing (Step S1703), the management computer 101 selects candidates for the allocation-changed-to I/O processing unit 132, which takes over the processing of the logical volume 134 the allocation of which is to be changed (Step S1704). Specifically, the management computer 101 selects the I/O processing units 132 that are, for example, low in average resource utilization ratio over a past given period in ascending order of average utilization ratio as candidates for the allocation-changed-to I/O processing unit 132. However, the I/O processing unit 132 that has "not permitted" as the value of the allocation change permission field 702 in the load leveling permitted unit management table 700 is not selected as a candidate for the allocation-changed-to I/O processing unit 132.

The management computer 101 may select candidates for the allocation-changed-to I/O processing unit 132 from among the I/O processing units 132 that are located in the same storage apparatus 103 as the allocation-changed-from I/O processing unit 132. The management computer 101 may instead select candidates for the allocation-changed-to I/O processing unit 132 from other storage apparatus 103 than the storage apparatus 103 where the allocation-changed-from I/O processing unit 132 is located.

In the case where the allocation-changed-to I/O processing unit 132 and the allocation-changed-from I/O processing unit 132 differ from each other in limit performance (for example, CPU operating frequency), the management computer 101 modifies a value in the second resource utilization ratio information 1200 based on the difference in limit performance between the I/O processing units 132, and then executes Step S1705 and subsequent steps.

For example, when the CPU operating frequency of the allocation-changed-from I/O processing unit 132 is 4 GHz and the CPU operating frequency of the allocation-changed-to I/O processing unit 132 is 8 GHz, the allocation-changed-to I/O processing unit 132 has twice higher CPU performance and affects the resource utilization ratio of I/O processing 0.5 times less. The management computer 101 accordingly multiplies the resource utilization ratio of the logical volume 134 the allocation of which is to be changed by 0.5 in the second resource utilization ratio information 1200, and uses the modified value in the execution of Step S1705 and subsequent steps.

The management computer 101 next selects an optimum allocation change idea (Step S1705). Specifically, the management computer 101 selects, for example, from an aggregation of allocation change ideas each of which is a combination of one of the logical volumes 134 selected in the allocation change target selecting processing (Step S1703) and one of the candidates for the allocation-changed-to I/O processing unit 132 selected in Step S1704, an allocation change idea that is most effective in remedying the threshold overrun, and adds the selected idea to the tail end of the allocation change plan.

More specifically, the management computer 101 first creates allocation change ideas each of which is a combination of, for example, the I/O processing unit 132 selected in Step S1702 as a unit from which the allocation is changed, the logical volume 134 selected in the allocation change target selecting processing (Step S1703), and one of the candidates for the allocation-changed-to I/O processing unit 132 selected in Step S1704.

The management computer 101 next executes simulation for every one of the combinations defined in the created allocation change ideas. Specifically, the management computer 101 conducts simulation by, for example, calculating, for each allocation change idea created, at a given time interval within a simulation period, a resource utilization ratio that the allocation-changed-from I/O processing unit 132 will have after an allocation change according to the allocation change idea is executed (hereinafter referred to as "resource utilization ratio Ra"), and a resource utilization ratio that the allocation-changed-to I/O processing unit 132 will have after the allocation change according to the allocation change idea is executed (hereinafter referred to as "resource utilization ratio Rb").

The resource utilization ratio Ra is a value that is obtained by subtracting the resource utilization ratio of the logical volume 134 selected in Step S1703 from the resource utilization ratio of the allocation-changed-from I/O processing unit 132 selected in Step S1702.

The resource utilization ratio Rb is a value that is obtained by adding the resource utilization ratio of the logical volume 134 selected in Step S1703 to the resource utilization ratio of the allocation-changed-to I/O processing unit 132 of the allocation change idea in question which is one of the candidates selected in Step S1704.

Pieces of time-series data of the resource utilization ratios Ra and Rb calculated for each allocation change idea created at a given time interval in a simulation period are obtained in this manner.

The management computer 101 then calculates a threshold overrun period for the time-series data of the resource utilization ratio Ra and for the time-series data of the resource utilization ratio Rb each to obtain the sum of the two threshold overrun periods. The threshold is selected from the running quality-threshold association table 900 or the threshold information 1000.

The management computer 101 also calculates a threshold excess in each of the threshold over run periods of the time-series data of the resource utilization ratios Ra and Rb to obtain the sum of the two threshold excesses. The threshold excess of the resource utilization ratio Ra is the sum of values that are obtained by subtracting the threshold from each piece of the time-series data of the resource utilization ratio Ra in its threshold overrun period. Similarly, the threshold excess of the resource utilization ratio Rb is the sum of values that are obtained by subtracting the threshold from each piece of the time-series data of the resource utilization ratio Rb in its threshold overrun period.

The management computer 101 then selects, for example, an allocation change idea in which the sum of the threshold overrun periods is shortest as the most effective allocation change. In the case where the sum of the threshold overrun periods is shortest in a plurality of allocation change ideas, the management computer 101 selects an allocation change idea in which the sum of the threshold excesses is smallest. The selected allocation change idea is added to the tail end of the allocation change plan in the main storage device or the auxiliary storage device. The allocation change plan after the addition serves as the base state.

While the resource utilization ratios Ra and Rb are used in the example described above, the management computer

101 may instead use only one of the resource utilization ratios Ra and Rb. When an allocation change idea is selected in Step S1705, the allocation change count used in Step S1701 is incremented.

The management computer 101 next conducts the detection of allocation change vacillation for the allocation change idea selected in Step S1705 (Step S1706). The allocation change vacillation refers to a state in which the changed-from resource of one allocation change idea is not set as the changed-from resource of another allocation change idea but is set as the changed-to resource of one of other allocation change ideas, and the changed-to resource of the one allocation change idea is not set as the changed-to resource of another allocation change idea but is set as the changed-from resource of one of other allocation change ideas.

For instance, the allocation change vacillation means a state in which the allocation of the particular logical volume 134 is changed repeatedly among the same set of I/O processing units 132, such as when the allocation of a logical volume Vol X is changed repeatedly between an I/O processing unit Pa and an I/O processing unit Pb, or when the allocation of the logical volume Vol X is changed repeatedly among the I/O processing unit Pa, the I/O processing unit Pb, and an I/O processing unit Pc.

In the case where an allocation change vacillation is detected (Step S1706: Yes), the management computer 101 proceeds to Step S1707. In the case where no vacillation is detected (Step S1706: No), the management computer 101 returns to Step S1701.

When an allocation change vacillation is detected (Step S1706: Yes), the management computer 101 executes processing of avoiding the vacillation (Step S1707), and returns to Step S1701. Specifically, the management computer 101 executes the vacillation avoiding processing by, for example, deleting an entry of the allocation change idea that corresponds to the vacillation from the allocation change plan. The management computer 101 searches the allocation change permitted volume management table 800 for an entry of the logical volume 134 that corresponds to the vacillation, and updates the value of the allocation change permission field 802 to "not permitted" in the entry. When the management computer 101 returns to Step S1701, the allocation change plan from which the entry of the allocation change idea corresponding to the vacillation has been deleted serves as the base state.

The management computer 101 executes allocation change plan optimizing processing (Step S1708), ends the allocation change plan generating processing (Step S1502), and proceeds to Step S1503. Details of the allocation change plan optimizing processing (Step S1708) are described later.

<Allocation Change Target Selecting Processing (Step S1703)>

Figure 18:
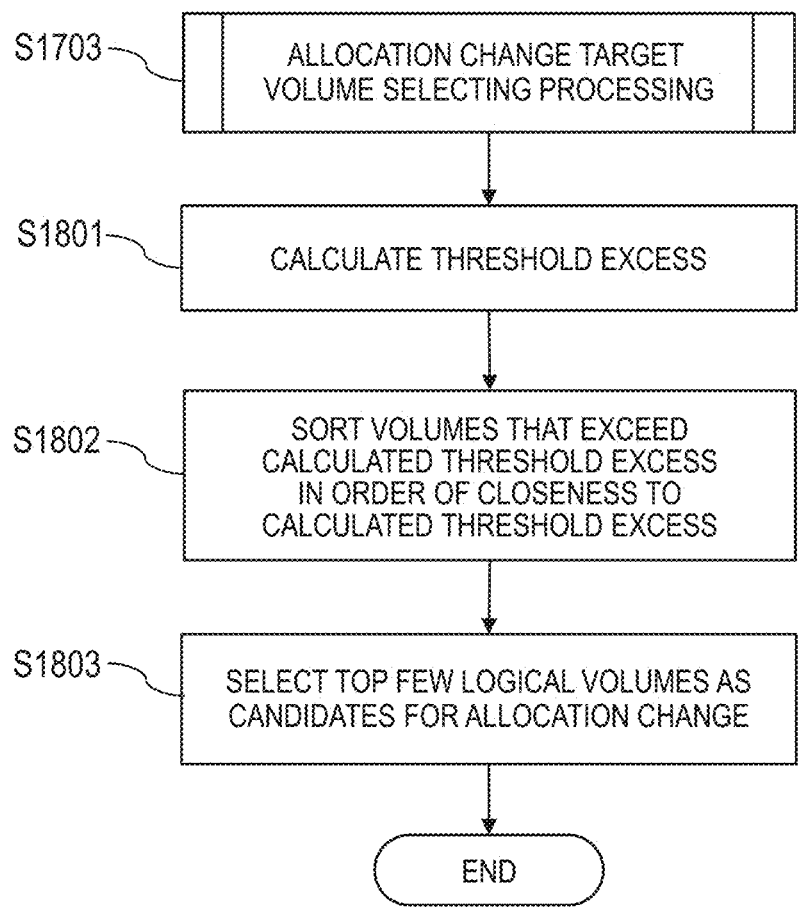
FIG. 18 is a flow chart for illustrating an example of detailed processing steps of the allocation change target selecting processing (Step S1703), which is illustrated in FIG. 17.

FIG. 18 is a flow chart for illustrating an example of detailed processing steps of the allocation change target selecting processing (Step S1703), which is illustrated in FIG. 17. The allocation change target selecting processing (Step S1703) is processing of selecting the logical volume 134 that has a resource utilization ratio close to the resource utilization ratio threshold excess of the I/O processing unit 132 in question at a point in time, and that is handled by the I/O processing unit 132. The logical volume 134 that minimizes the increase of load on the I/O processing unit 132 that takes over the processing of the logical volume 134 can be selected through this processing.

When the logical volume 134 that has a resource utilization ratio smaller than the threshold excess is selected from among the logical volumes 134 handled by the I/O processing unit 132, the allocation change count rises in order to solve the threshold overrun state of the I/O processing unit 132, with the result that the number of the logical volumes 134 that are at risk from the allocation changes increases. The management computer 101 therefore searches in the allocation change target selecting processing (Step S1703) for an allocation change target that solves the threshold overrun state of the I/O processing unit 132 at a low allocation change count while reducing the adverse effect of a resource to which the allocation is changed.

In FIG. 18, the management computer 101 treats the I/O processing unit 132 selected in Step S1702 as the allocation-changed-from I/O processing unit 132, and calculates the threshold excess of the resource utilization ratio of this I/O processing unit 132 (Step S1801). The management computer 101 calculates the threshold excess by, for example, subtracting the threshold from the resource utilization ratio of the allocation-changed-from I/O processing unit 132 that is highest in the threshold overrun period where the threshold is exceeded. The threshold is selected from the running quality-threshold association table 900 or the threshold information 1000.

The management computer 101 next obtains from the second resource utilization ratio information 1200 the resource utilization ratio of each logical volume 134 that is handled by the allocation-changed-from I/O processing unit 132, and sorts the logical volumes 134 having resource utilization ratios that exceed the calculated threshold excess in ascending order of difference from the threshold excess (Step S1802). The logical volumes 134 having resource utilization ratios that do not exceed the calculated threshold excess are sorted in ascending order of difference from the threshold excess, after the volumes that exceed the threshold excess are sorted.

Figure 19:
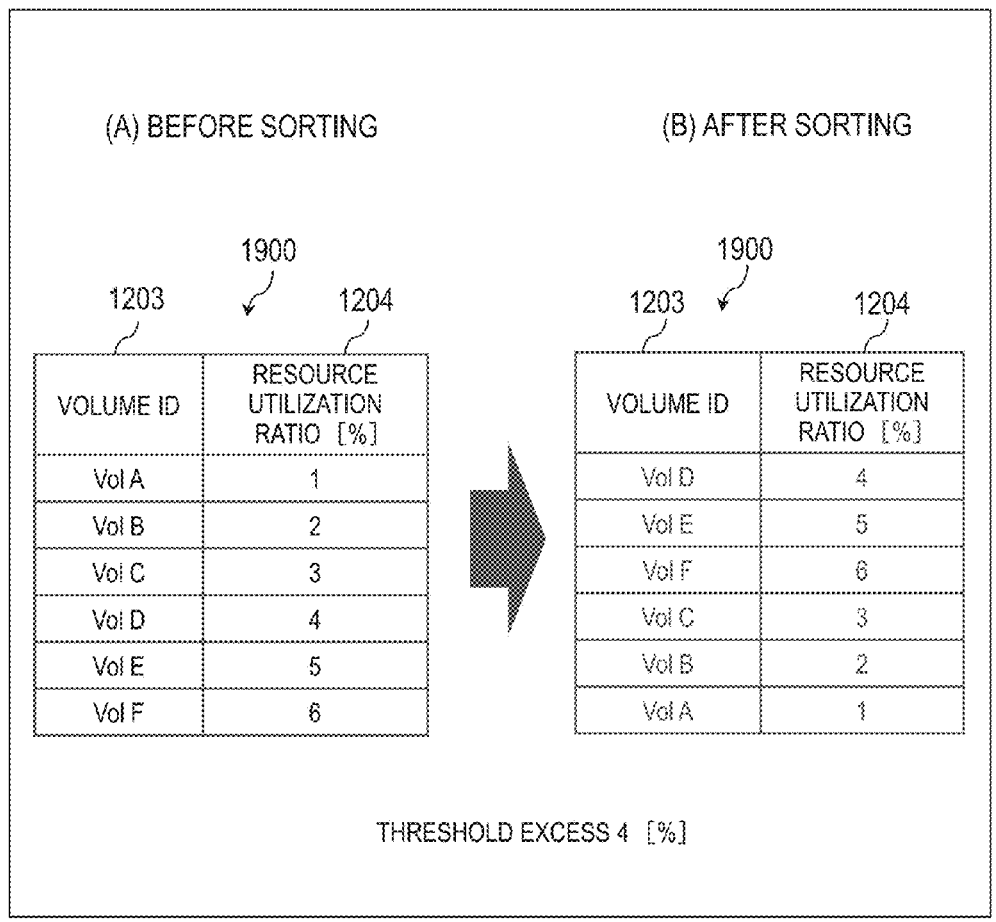
FIG. 19 is an explanatory diagram for illustrating an example of the sorting processing of Step S1802.

FIG. 19 is an explanatory diagram for illustrating an example of the sorting processing of Step S1802. A table 1900 in FIG. 19 is an excerpt of the second resource utilization ratio information 1200, and includes the volume ID field 1203 and values of the resource utilization ratio field 1204 at one point in time for the sake of simplification of the description.

In the table 1900 before sorting, the logical volume Vol A has a resource utilization ratio of 1%, the logical volume Vol B has a resource utilization ratio of 2%, the logical volume Vol C has a resource utilization ratio of 3%, the logical volume Vol D has a resource utilization ratio of 4%, the logical volume Vol E has a resource utilization ratio of 5%, and the logical volume Vol F has a resource utilization ratio of 6%. When the threshold excess of the I/O processing unit 132 is 4% and the sorting processing (Step S1802) is executed in this state, the logical volumes are sorted into an order in which the logical volume Vol D (4%) comes first, followed by the logical volume Vol E (5%), then the logical volume Vol F (6%), the logical volume Vol C (3%), the logical volume Vol B (2%), and the logical volume Vol A (1%).

Returning to FIG. 18, the management computer 101 selects a plurality of logical volumes 134 as allocation change candidates (Step S1803). Specifically, the management computer 101 preferentially selects, for example, the logical volumes 134 that are accessible to the tenant 400 for which a value indicating the lowest importance level is stored in the importance field 1302 of the tenant importance management table 1300, from among the top logical volumes 134 sorted in Step S1802.

A case in which five logical volumes 134 are selected from among the logical volumes 134 that are ranked within top ten as a result of the sorting is given as an example. The management computer 101 selects the logical volumes 134 that can be accessed by the tenant 400 that has an importance level "low", from among the top ten logical volumes 134 in the logical volume group 133 sorted by the sorting processing (Step S1802).

In the case where the number of the logical volumes 134 selected as candidates falls short of five, the management computer 101 selects the logical volumes 134 that can be accessed by the tenant 400 that has an importance level "intermediate", which is immediately above the importance level "low", from among the remaining logical volumes 134 that are ranked high as a result of the sorting. Similarly, in the case where the number of the logical volumes 134 selected as candidates still falls short of five, the management computer 101 selects the logical volumes 134 that can be accessed by the tenant 400 that has an importance level "high", which is above the importance level "intermediate", from among the remaining logical volumes 134 that are ranked high as a result of the sorting.

There is a case where a storage device in which the logical volumes 134 are located is in the external storage apparatus 103, which is coupled via the I/O port 313. Actual I/O processing in this case is executed in the I/O processing units 132 of the external storage apparatus 103. The resource utilization ratios of the I/O processing units 132 in the external storage apparatus 103 may be higher than the resource utilization ratio of the allocation-changed-from I/O processing unit 132 in some cases, and there is a possibility that a large quantity of I/O processing is being executed in the external storage apparatus 103 at present. The management computer 101 may therefore exclude the logical volumes 134 that are located in a storage device of the external storage apparatus 103 from the selection of candidates for the allocation change target volume even when the logical volumes 134 of the external storage apparatus 103 are ranked high.

In this manner, the logical volume 134 that has a resource utilization ratio close to the resource utilization ratio threshold excess of the I/O processing unit 132 in question at a point in time, and that is handled by the I/O processing unit 132 is selected in the allocation change target selecting processing (Step S1703). This ensures that the selected logical volume 134 minimizes the increase of load on the I/O processing unit 132 that takes over the processing of the logical volume 134.

After the allocation change, on the other hand, a margin between the resource utilization ratio of the I/O processing unit 132 whose allocation of the logical volume 134 has been changed and the threshold is minimized. The management computer 101 accordingly searches the tenant-volume association table 500 to identify the logical volume 134 that is used by the tenant 400 that has a high importance level (e.g., "high") in the tenant importance management table 1300. The management computer 101 may then obtain from the second resource utilization ratio information 1200 the resource utilization ratio of the logical volume 134 used by the tenant 400 that is high in importance, multiply the obtained resource utilization ratio by, for example, 1.2, and uses the resultant value in the execution of the load leveling program 111. This way, the management computer 101 can keep a margin between the resource utilization ratio of the I/O processing unit 132 whose allocation of the logical volume 134 has been changed and the threshold to a minimum for the tenant 400 that is important, while at the same time expanding the margin.

The execution of the load leveling program 111 is sometimes started with a scale-up of one of the servers 102 or a scale-up of one of the logical volumes 134 as a trigger, as described with reference to FIG. 15. The logical volume that is used by the scaled up server 102, or the I/O processing unit 132 that handles the scaled up logical volume 134, is set to a resource utilization ratio higher by a given amount, for example, 1.2 times, and the higher resource utilization ratio is used in the execution of the load leveling program 111.

When allocation is changed for the logical volume 134 to which a resource utilization ratio higher by the given amount is set as a result of a scale-up, the management computer 101 can thus keep a margin between the resource utilization ratio of the I/O processing unit 132 that handles this logical volume 134 and the threshold to a minimum, while at the same time expanding the margin.

A scale-up of one of the servers 102 increases access to the storage apparatus 103 and, consequently, the resource utilization ratios of the I/O processing units 132 rise in conjunction with the scale-up of the server 102. In the case where the load leveling program 111 is executed without setting a margin, the resource utilization ratio of the I/O processing unit 132 that handles the processing of the logical volume 134 used by the scaled up server 102 exceeds the threshold, and may adversely affect the response performance of the relevant storage apparatus 103. By setting a margin in advance to the resource utilization ratio of the I/O processing unit 132 that handles the logical volume 134, a drop in the response performance of the storage apparatus 103 can be prevented.

The same can be said to a scale-up of one of the logical volumes 134: a rise in the limit performance of the logical volume 134 increases the quantity of I/O processing, and the resource utilization ratio of the I/O processing unit 132 that handles I/O processing of the scaled up logical volume 134 exceeds the threshold, which may cause a drop in response performance. In this case also, a drop in the response performance of the relevant storage apparatus 103 can be prevented by setting in advance a margin to the resource utilization ratio of the I/O processing unit 132 that handles the logical volume 134.

<Allocation Change Plan Optimizing Processing (Step S1708)>

The allocation change plan optimizing processing (Step S1708) illustrated in FIG. 17 is described next. An allocation change plan that is generated by repeating Steps S1701 to S1707 of FIG. 17 allows an allocation-changed-to resource in one allocation change combination to be an allocation-changed-from resource in another allocation change combination at a stage where the resource utilization ratio of the I/O processing unit 132 is optimized. For example, the allocation change plan tolerates an allocation change in which the I/O processing unit 132 that handles a particular logical volume 134 is changed from the I/O processing unit Pa to the I/O processing unit Pb, and then from the I/O processing unit Pb to the I/O processing unit Pc.

Rather than changing the allocation in a plurality of steps as this, changing the allocation from the I/O processing unit Pa to the I/O processing unit Pb in a single step is more efficient in order to minimize risk that is incurred by executing allocation changing processing. Optimization for that purpose is executed in the allocation change plan optimizing processing (Step S1708).

Figure 20:
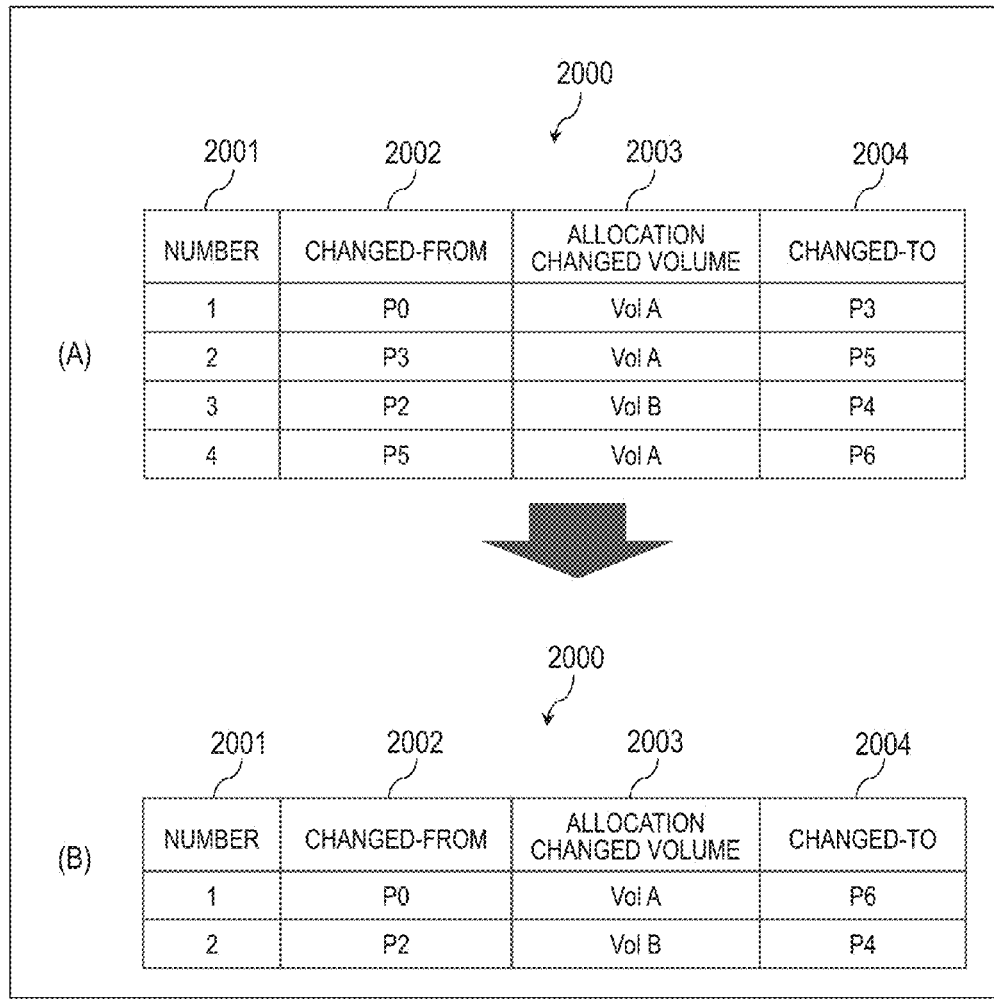
FIG. 20 is an explanatory diagram for illustrating an example of the allocation change plan optimizing processing (Step S1708).

FIG. 20 is an explanatory diagram for illustrating an example of the allocation change plan optimizing processing (Step S1708). An allocation change plan 2000 includes a number field 2001, a changed-from field 2002, an allocation changed volume field 2003, and a changed-to field 2004, and defines an allocation change combination in each entry. In FIG. 20, part (A) is the allocation change plan 2000 before optimization, and part (B) is the allocation change plan 2000 after optimization.

The number field 2001 in the allocation change plan 2000 is an area in which a number unique to an allocation change idea is stored. The changed-from field 2002 is an area in which identification information is stored that uniquely identifies the I/O processing unit 132 from which the allocation of one logical volume 134 is changed. The allocation changed volume field 2003 is an area in which identification information is stored that uniquely identifies the logical volume 134 the allocation of which is changed. The changed-to field 2004 is an area in which identification information is stored that uniquely identifies the I/O processing unit 132 to which the allocation of the logical volume 134 is changed.

The allocation change plan 2000 of part (A) includes an allocation change idea in an entry having a number "1" in which the allocation of the logical volume Vol A is changed from the I/O processing unit P0 to an I/O processing unit P3. In an allocation change idea of an entry having a number "2", the allocation of the logical volume Vol A is changed from the I/O processing unit P3 to an I/O processing unit P5. In an allocation change idea of an entry having a number "4", the allocation of the logical volume Vol A is changed from the I/O processing unit P5 to an I/O processing unit P6.

The post-optimization allocation change plan 2000 of part (B) includes an allocation change idea in an entry having a number "1" in which the allocation of the logical volume Vol A is changed from the I/O processing unit P0 to the I/O processing unit P6. An allocation change idea of an entry having a number "2" corresponds to an allocation change idea of an entry having a number "3" in the pre-optimization allocation change plan 2000 of part (A). The entry count and the allocation change count are thus reduced after optimization.

Figure 21:
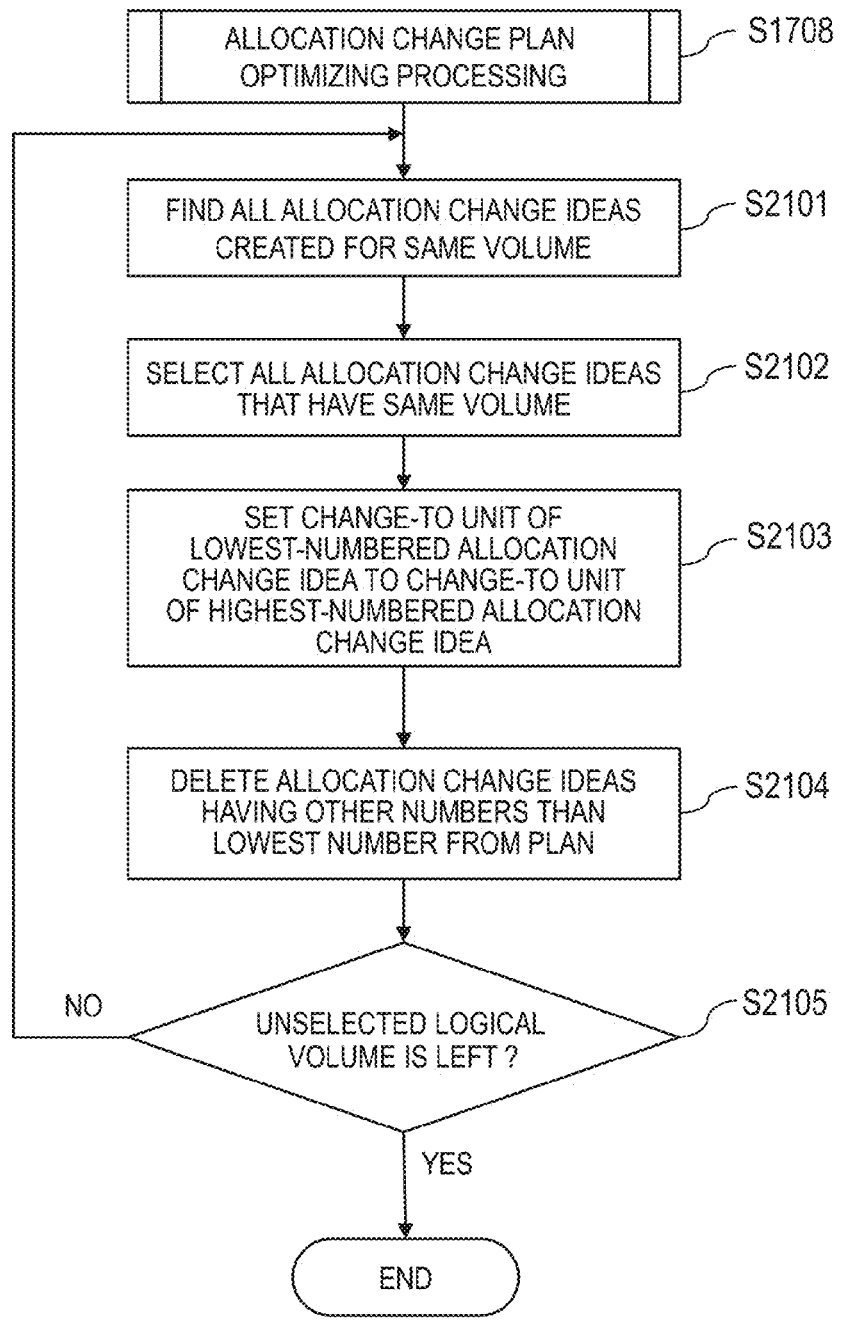
FIG. 21 is a flow chart for illustrating an example of detailed processing steps that are included in the processing of optimizing the allocation change plan (Step S1708).

FIG. 21 is a flow chart for illustrating an example of detailed processing steps that are included in the processing of optimizing the allocation change plan 2000 (Step S1708). The management computer 101 searches for all allocation change ideas that are created for the same logical volume 134 (Step S2101). In the allocation change plan 2000 of part (A) of FIG. 20, allocation change ideas of the entries having the numbers "1", "2, and "4" are found.

The management computer 101 next selects all allocation change ideas created for the same logical volume 134 that have not been selected, out of the allocation change ideas found in Step S2101 (Step S2102). In the allocation change plan 2000 of part (A) of FIG. 20, allocation change ideas of the entries having the numbers "1", "2, and "4" are selected.

The management computer 101 then identifies an entry that has the lowest number and an entry that has the highest number of the entries selected in Step S2102, and overwrites the value of the changed-to field 2004 in the lowest-number entry with the value of the changed-to field 2004 in the highest-number entry (Step S2103). In the allocation change plan 2000 of part (A) of FIG. 20, the management computer 101 changes a value "P3" of the changed-to field 2004 in the entry having the number "1" to a value "P6" of the changed-to field 2004 in the entry having the number "4".

The management computer 101 then deletes from the allocation change plan 2000 entries that are selected in Step S2102 and that have other numbers than the lowest number (Step S2104). In part (A) of FIG. 20, the allocation change ideas of the entries having the numbers "2" and "4" are deleted. After the deletion, the numbers in the number field 2001 are overwritten in ascending order. The allocation change idea of the entry that has the number "3" in the allocation change plan 2000 of part (A) is therefore the allocation change idea of the entry that has the number "2" in part (B).

Thereafter, the management computer 101 determines whether or not allocation change ideas created for the same logical volume 134 that have not been selected are left among the allocation change ideas found in Step S2101 (Step S2105). When there are allocation change ideas that meet the criteria (Step S2105: Yes), the management computer 101 returns to Step S2102. When there are no longer allocation change ideas that meet the criteria (Step S2105: No), on the other hand, the processing of optimizing the allocation change plan 2000 (Step S1708) ends.

<Output Screen Example>

Figure 22:
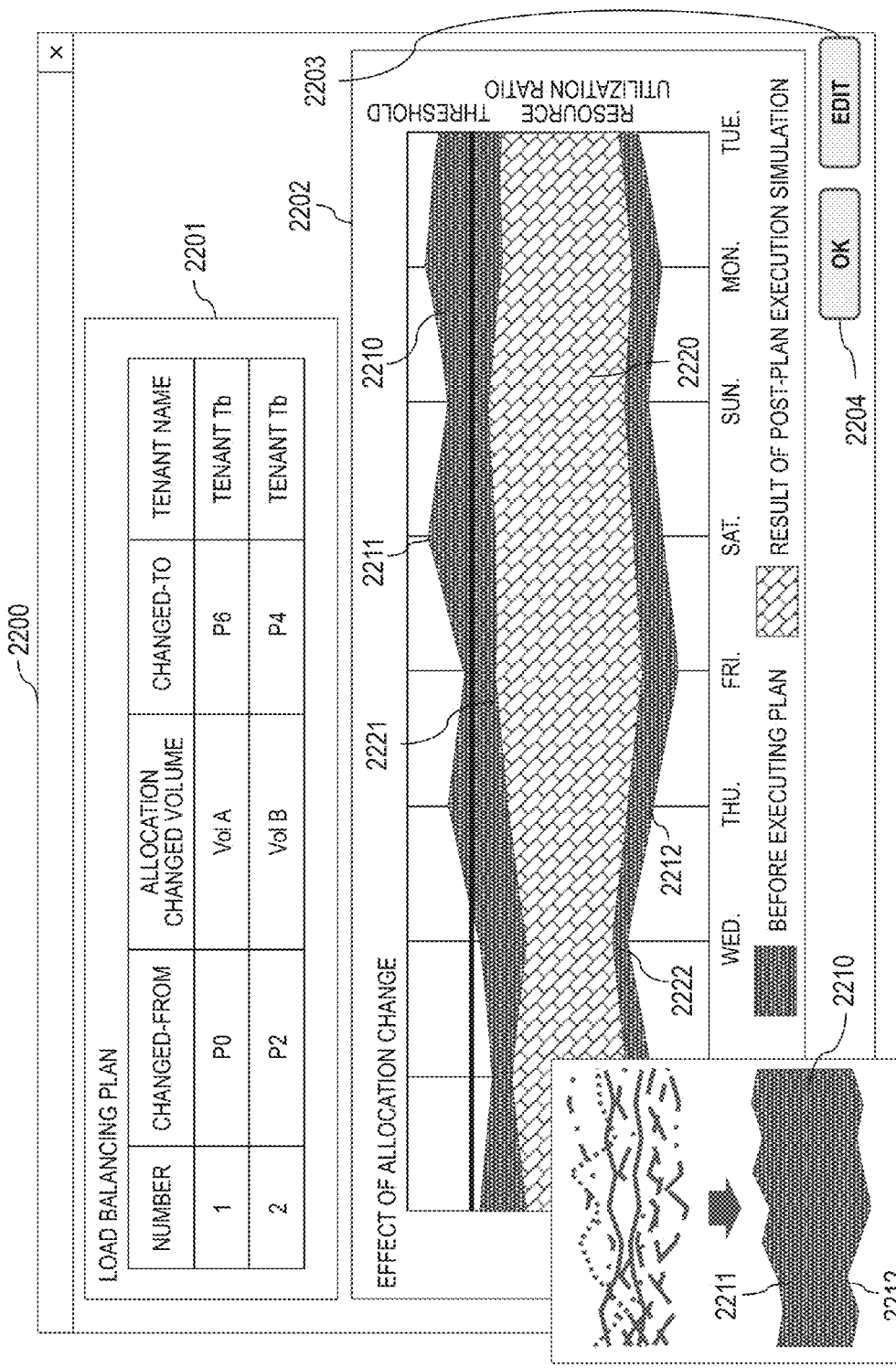
FIG. 22 is an explanatory diagram for illustrating an example of an output screen on which the allocation change plan obtained through the load leveling processing of the management computer is output.

FIG. 22 is an explanatory diagram for illustrating an example of an output screen on which the allocation change plan 2000 obtained through the load leveling processing of the management computer 101 is output. An output screen 2200 of FIG. 22 is displayed through the report outputting processing (Step S1504). The management computer 101 displays a load balancing plan 2201 in which the generated allocation change plan 2000 is combined with the names of tenants that are using the logical volumes 134 the allocation of which is to be changed, thereby enabling the administrator to check the tenant 400 that is adversely affected by the allocation change. The load balancing plan 2201 needs to include at least the allocation change plan 2000.

The management computer 101 may refer to the tenant-volume association table 500 in order to display the names of storage apparatus where the logical volumes 134 the allocation of which is to be changed are mounted. The output screen 2200 may be displayed on the output device of the management computer 101, or may be displayed on the display-use computer 104, in which case the management computer 101 transmits information about the output screen 2200 to the display-use computer 104.

In FIG. 22, the management computer 101 displays graph information 2202, which indicates effects of the allocation change, in combination with the load balancing plan 2201. Of the graph information 2202, a first graph 2210 indicates how resource utilization ratio fluctuations of the I/O processing units 132 shift before the allocation change plan 2000 is executed. The management computer 101 creates the first graph 2210 with the use of the first resource utilization ratio information 1100, and displays the created graph.

A second graph 2220 indicates how resource utilization ratio fluctuations of the I/O processing units 132 shift after the allocation change plan 2000 is executed. Specifically, the management computer 101 executes, for example, a simulation for the post-allocation change system configuration under the same conditions as before the allocation change, and creates and displays a graph in which the resource utilization ratios of the I/O processing units 132 after the allocation change are organized as a result of executing the simulation. The first graph 2210 and the second graph 2220 are areas surrounded by lines 2211 and 2221, which run through maximum values of the resource utilization ratios of the respective I/O processing units 132 at respective points in time, and lines 2212 and 2222, which run through minimum values thereof.

A narrower graph width indicates smaller resource utilization ratio fluctuations among the I/O processing units 132, and a wider graph width indicates larger resource utilization ratio fluctuations among the I/O processing units 132. In the example of FIG. 22, the first graph 2210 is wider than the second graph 2220, and is accordingly larger in resource utilization ratio fluctuations among the I/O processing units 132. The management computer 101 displays the effects of the allocation change plan 2000 in the form of a graph, thereby enabling the administrator to visually check how much resource utilization ratio fluctuations are reduced and how much the threshold overrun is remedied by executing the allocation change plan 2000.

The administrator can make a change to the load balancing plan 2201 by pressing an edit button 2203. When a change is made, the management computer 101 executes a simulation again based on the changed load balancing plan 2201, and creates and displays the post-change second graph 2220.

With the press of an OK button 2204, the management computer 101 changes the system configuration by following the load balancing plan 2201. In the example of FIG. 22, the I/O processing unit 132 that handles the logical volume Vol A is switched from the I/O processing unit P0 to the I/O processing unit P6, and the I/O processing unit 132 that handles the logical volume Vol B is switched from the I/O processing unit P2 to the I/O processing unit P4. Specifically, the management computer 101 sends update instructions to the I/O processing units P0 and P2, which then delete "Vol A" and "Vol B", respectively, from pieces of management information that are used to manage the logical volumes 134 and that are stored in the internal memories of the I/O processing units P0 and P2. Similarly, the management computer 101 sends update instructions to the I/O processing units P6 and P4, which then add "Vol A" and "Vol B", respectively, to pieces of allocation information that are about the allocation of the logical volumes 134 and that are stored in the internal memories of the I/O processing units P6 and P4. The management computer 101 also updates the I/O processing unit-volume association table 600 in the same manner. This completes the update processing.

Figure 23:
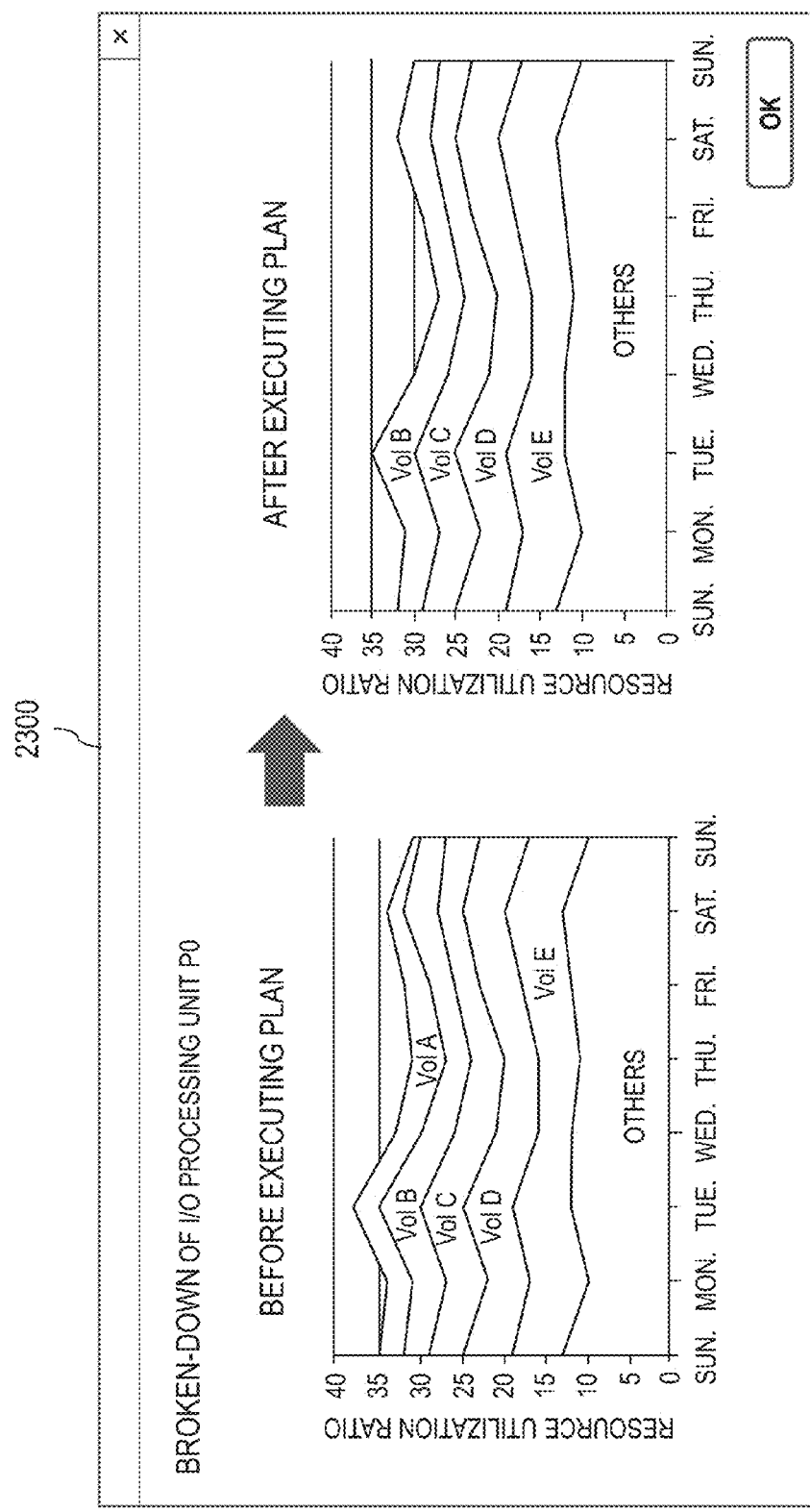
FIG. 23 is an explanatory diagram for illustrating an example of an output screen on which a change to the broken-down resource utilization ratio of each I/O processing unit is output.

FIG. 23 is an explanatory diagram for illustrating an example of an output screen on which a change to the broken-down resource utilization ratio of each I/O processing unit 132 is output. As is the case for the output screen 2200 of FIG. 22, an output screen 2300 of FIG. 23 is displayed through the report outputting processing (Step S1504). The output screen 2300 may be displayed on the output device of the management computer 101, or may be displayed on the display-use computer 104, in which case the management computer 101 transmits information about the output screen 2300 to the display-use computer 104.

The output screen 2300 is an example of a screen for checking the effects of the allocation change plan 2000, which is generated through the load leveling processing. An area graph is displayed in order to check the effects of the allocation change plan 2000. The area graph is a graph in which the resource utilization ratios of the respective logical volumes 134, or the resource utilization ratios of the respective logical volume groups 133, that are broken down from the resource utilization ratio of an arbitrary I/O processing unit 132 are stacked.

For example, the resource utilization ratio of the changed-from I/O processing unit 132 is reduced by eliminating a resource utilization ratio that has been spent on I/O processing of the logical volume 134 the allocation of which is to be changed. The management computer 101 can display how the eliminated resource utilization ratio affects in time series on the output screen 2300 of FIG. 23, and the administrator sees the influence by looking at the screen 2300.

The resource utilization ratio of the changed-to I/O processing unit 132, on the other hand, is increased by an amount necessary for I/O processing of the logical volume 134 the allocation of which is to be changed. The management computer 101 can display how this additional resource utilization ratio affects the resource utilization ratio of the I/O processing unit 132 in time series on the output screen 2300. The output screen 2300 of FIG. 23 displays, for example, a change observed in the resource utilization ratio of the I/O processing unit P0 before and after the execution of the allocation change plan 2000. The resource utilization ratio of the I/O processing unit P0 is reduced by an amount corresponding to the resource utilization ratio of the logical volume Vol A and, based on the reduction, the administrator can confirm that the threshold overrun is remedied for the I/O processing unit P0.

According to this embodiment described above, when the load is unbalanced among the I/O processing units 132 of the storage apparatus 103, the management computer 101 calculates the allocation change plan 2000 for leveling the load, and presents the calculated allocation change plan 2000 to the administrator. This enables the administrator to determine the propriety of the allocation change plan 2000 beforehand.

The processing of leveling the load among the I/O processing units 132 which is executed on the management computer 101 in this embodiment may instead be executed on the storage apparatus 103. In this case, the storage apparatus 103 can make an inquiry to the management computer 101 about information that is not held in the storage apparatus 103. The load leveling processing may also be executed automatically in the case where the administrator gives an advance approval.

The management computer 101 may use a method similar to the processing of generating the allocation change plan 2000 for the I/O processing units 132 which is described in this embodiment to generate the allocation change plan 2000 for leveling the resource utilization ratios of the I/O ports 131 or the network I/Fs 303, instead of the I/O processing units 132. The resource utilization ratio used in this case is, for example, a value calculated by dividing the number of I/O processing requests per second by the limit IOPS. The resource utilization ratio is not limited to the unit of one second, and may be measured in units of a given length of time that is set in advance.

The management computer 101 may use a method similar to the processing of generating the allocation change plan 2000 for the I/O processing units 132 which is described in this embodiment to generate the allocation change plan 2000 for leveling the resource utilization ratios of logical devices or the RAID groups 315 from which the logical volumes 134 are created, or the resource utilization ratios of the logical volumes 134, instead of the resource utilization ratio of the I/O processing units 132.

The load on one I/O processing unit 132 in the storage apparatus 103 is thus determined by the type and the number of storage devices that the I/O processing unit 132 handles. The concentration of load on one I/O processing unit 132 may occur due to a sudden increase of access even in the storage apparatus 103 that is normally run with proper loads applied to the I/O processing units 132. In addition, the limit I/O per second (IOPS) varies from one type of storage device to another and when, for example, an SSD which is superior in speed to HDD devices is employed as a storage device, the high limit performance of the SSD makes the limit performance of the I/O processing unit 132 that handles the SSD a bottleneck. An imbalance among loads on the plurality of I/O processing units 132 in each storage apparatus 103 is caused also by the virtualization of the servers 102 and tier control of storage device groups, and the imbalance increases the chance of performance failure in which the response time of the storage apparatus 103 drops.

With this embodiment, the management computer 101 can generate the allocation change plan 2000 that levels the loads on the I/O processing units 132, by keeping the allocation change count to a minimum, and can propose the generated plan to the administrator. The management computer 101 can thus easily level the loads on the I/O processing units 132 while reducing adverse effects on the servers 102 that are important, even in an environment where the system configuration changes dynamically and the loads on the storage apparatus fluctuate greatly.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A computer system, comprising:
    a server configured to transmit one or more input/output processing requests, which each contain identification information which identifies one of a plurality of logical volumes;
    a storage apparatus comprising a plurality of input/output processing units configured to process the input/output processing requests, and the plurality of logical volumes each created from one or more storage devices;
    a management computer to manage the storage apparatus; and
    a processor programmed to manage a resource group of resources located along a path between the server and the plurality of logical volumes through which the input/output processing request is transmitted,
    wherein the processor is further programmed to:
    when a load on a first resource of the resource group exceeds a threshold, calculate a load balancing plan to distribute a part of the load on the first resource to a second resource of the resource group, the calculation of the load balancing plan including to:
        calculate a threshold excess as an amount by which the load on the first resource exceeds the threshold,
        obtain, for each of the logical volumes at which the input/output processing requests from the first resource arrive, a load amount that is a part of the load on the first resource,
        select a logical volume for which the obtained load amount is equal to or more than the threshold excess, and a difference between the obtained load amount and the threshold excess is smallest out of all the obtained load amounts of the plurality of logical volumes, and
        calculate the load balancing plan to include switching from the first resource that accesses the selected logical volume to the second resource;
    output and display the load balancing plan; and
    distribute the load on the first resource to the second resource by following the load balancing plan, when an instruction to execute the load balancing plan is received as a result of outputting the load balancing plan,
    wherein the processor is further programmed to:
    when the calculated load balancing plan includes a plurality of allocation changes where each of the plurality of allocation changes indicates a combination of an allocation change target logical volume among the logical volumes, a changed-from resource of the resource group, and a changed-to resource of the resource group, identify two or more of the allocation changes that have a same allocation change target logical volume;
    detect a vacillation in the identified allocation changes, the vacillation being a state in which a same resource is the changed-from resource in at least one of the identified allocation changes and is the changed-to resource in a different at least one of the identified allocation changes;
    when the vacillation is detected, delete one or more of the latest identified allocation changes out of the identified allocation changes that correspond to the vacillation; and
    set the same logical volume common to the identified allocation change ideas as an allocation change prohibited volume.

2. The computer system according to claim 1, wherein, when obtaining, for each of the logical volumes at which the input/output processing requests from the first resource arrive, the load amount that is the part of the load on the first resource, the processor is further, programmed to:
    identify an importance level respectively set to each of the plurality of logical volumes; and
    adjust, for each of the plurality of logical volumes, the obtained load amount that is the of the load on the first resource according to the identified importance level.

3. The computer system according to claim 1, wherein the processor is further programmed to:
    calculate the load balancing plan with detection of a scale-up in one of the plurality of logical volumes as a trigger.

4. The computer system according to claim 3, wherein the processor is further programmed to:
   adjust the obtained load amount that is the part of the load on the first resource for the logical volume in which the scale-up has been detected.

5. The computer system according to claim 1, wherein the processor is further programmed to:
   calculate the load balancing plan with detection of a scale-up in the server as a trigger.

6. The computer system according to claim 5, wherein the processor is further programmed to:
   adjust the obtained load amount that is the part of the load on the first resource for the logical volume that receives the input/output processing requests from the server in which the scale-up has been detected.

7. The computer system according to claim 1, wherein the processor is further programmed to:
   identify the first resource that exceeds the threshold from among the resource group;
   determine whether or not a cause of the exceeded threshold by the first resource is an increase of the input/output processing requests based on how many input/output processing requests have been input to the first resource; and
   calculate the load balancing plan when the cause of the exceeded threshold overrun is an increase of the input/output processing requests, and stop calculating the load balancing plan when the cause of the exceeded threshold is not an increase of the input/output processing requests.

8. The computer system according to claim 1, wherein the processor is located in one of the management computer and the storage apparatus.

9. The computer system according to claim 1, wherein the resource group comprises processors of the plurality of input/output processing units.

10. The computer system according to claim 1, wherein the resource group comprises a group of ports of the storage apparatus through which the input/output processing requests are input/output.

11. The computer system according to claim 1, wherein the resource group comprises the plurality of logical volumes.

12. A non-transitory, computer readable medium which is provided in a computer system that includes a storage apparatus including a plurality of input/output processing units configured to process the input/output processing requests and a plurality of logical volumes each created from one or more storage devices, and a server configured to transmit one or more input/output processing requests, which each contain identification information which identifies one of the plurality of logical volumes, the non-transitory, computer readable medium storing a load-leveling program, that when executed by one or more processors in the computer system, causes the one or more processors to:
   when a load on a first resource of the resource group exceeds a threshold, calculate a load balancing plan to distribute a part of the load on the first resource to a second resource of the resource group, the calculation of the load balancing plan including to:
      calculate a threshold excess as an amount by which the load on the first resource exceeds the threshold,
      obtain, for each of the logical volumes at which the input/output processing requests from the first resource arrive, a load amount that is a part of the load on the first resource,
      select a logical volume for which the obtained load amount is equal to or more than the threshold excess, and a difference between the obtained load amount and the threshold excess is smallest out of all the obtained load amounts of the plurality of logical volumes, and
      calculate the load balancing plan to include switching from the first resource that accesses the selected logical volume to the second resource;
   output and display the load balancing plan; and
   distribute the load on the first resource to the second resource by following the load balancing plan, when an instruction to execute the load balancing plan is received as a result of outputting the load balancing plan,
   wherein the one of more processors are further programmed to:
   when the calculated load balancing plan includes a plurality of allocation changes where each of the plurality of allocation changes indicates a combination of an allocation change target logical volume among the logical volumes, a changed-from resource of the resource group, and a changed-to resource of the resource group, identify two or more of the allocation changes that have a same allocation change target logical volume;
   detect a vacillation in the identified allocation changes, the vacillation being a state in which a same resource is the changed-from resource in at least one of the identified allocation changes and is the changed-to resource in a different at least one of the identified allocation changes;
   when the vacillation is detected, delete one or more of the latest identified allocation changes out of the identified allocation changes that correspond to the vacillation; and
   set the same logical volume common to the identified allocation change ideas as an allocation change prohibited volume.

* * * * *